United States Patent
Birukawa et al.

[19]

[11] Patent Number: 5,986,977
[45] Date of Patent: Nov. 16, 1999

[54] METHOD FOR READING MAGNETIC SUPER RESOLUTION TYPE MAGNETO-OPTICAL RECORDING MEDIUM

[75] Inventors: Masahiro Birukawa, Osaka; Yasumori Hino, Nara; Norio Miyatake, Hyogo, all of Japan

[73] Assignee: Matsushita Electric Industrial Co., Ltd., Osaka, Japan

[21] Appl. No.: 08/883,549

[22] Filed: Jun. 26, 1997

[30] Foreign Application Priority Data

Jun. 28, 1996 [JP] Japan .................................... 8-170214

[51] Int. Cl.$^6$ ...................................................... G11B 11/00
[52] U.S. Cl. ...................... 369/13; 369/116; 429/694 EC
[58] Field of Search ........................... 369/13, 116, 275.2, 369/275.3, 110, 288, 283, 14; 360/59, 114; 428/694 ML, 694 EC, 694 MM

[56] References Cited

U.S. PATENT DOCUMENTS

| | | | |
|---|---|---|---|
| 5,706,259 | 1/1998 | Fukamachi et al. | 369/13 |
| 5,862,105 | 1/1999 | Nishimura | 369/13 |

FOREIGN PATENT DOCUMENTS

| | | |
|---|---|---|
| 3-242845 | 10/1991 | Japan . |
| 8-007383 | 1/1996 | Japan . |
| 8-017090 | 1/1996 | Japan . |

*Primary Examiner*—Ali Neyzari
*Attorney, Agent, or Firm*—Merchant & Gould P.C.

[57] ABSTRACT

A reading method for a magneto-optical recording medium is provided, irradiating laser light as a reading beam and using a magnetic head. High density and high transmission rate are possible and a correct reading can be performed according to the length of recording marks by reading the magneto-optical recording medium while impressing a magnetic field with an orientation promoting the translation of magnetic domain walls. In the magnetic super resolution type magneto-optical recording medium, which attains a signal only from one portion of the irradiation domain of the reading beam and has at least a recording layer and a reading layer on a substrate, the focused laser light is irradiated as a reading beam and the magnetic field is modulated, using the magnetic head, which is equipped with a slider and glides or floats on the recording medium. The magneto-optical recording medium is read, while impressing a magnetic field 161 that accelerates at least the transcription of the magnetization of the recording layer into the reading layer.

3 Claims, 18 Drawing Sheets

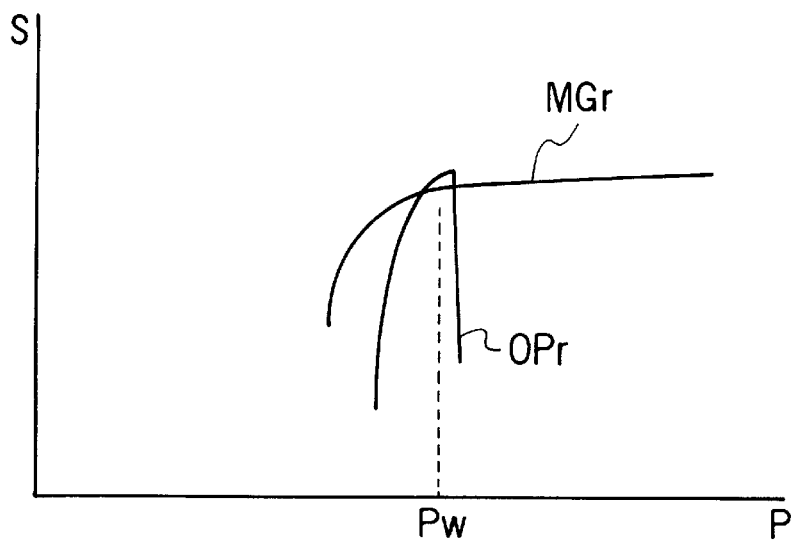
FIG. 10A
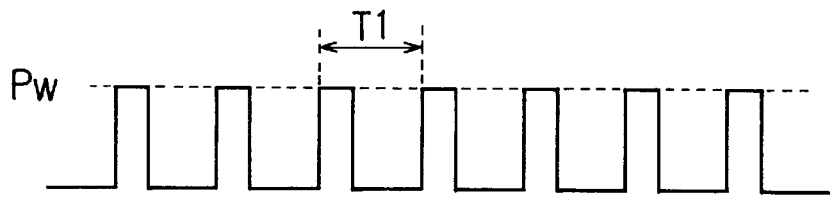
FIG. 10B
FIG. 10C
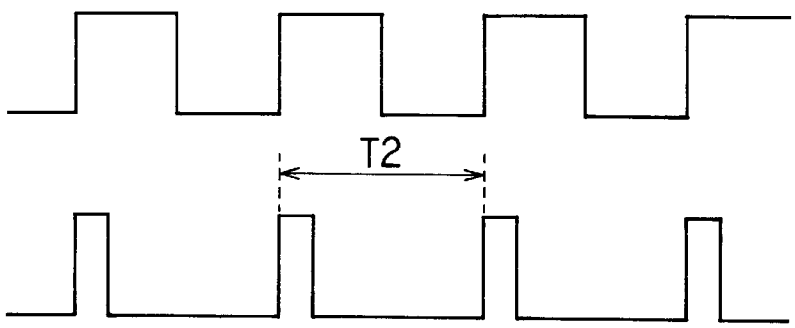
FIG. 10D
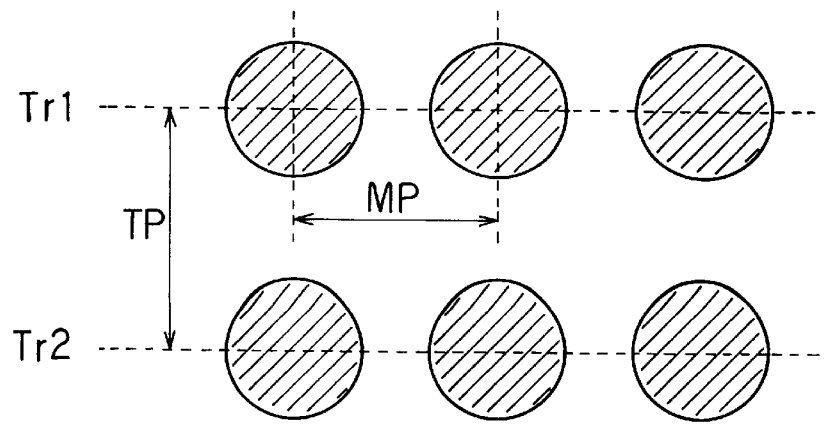
FIG. 10E

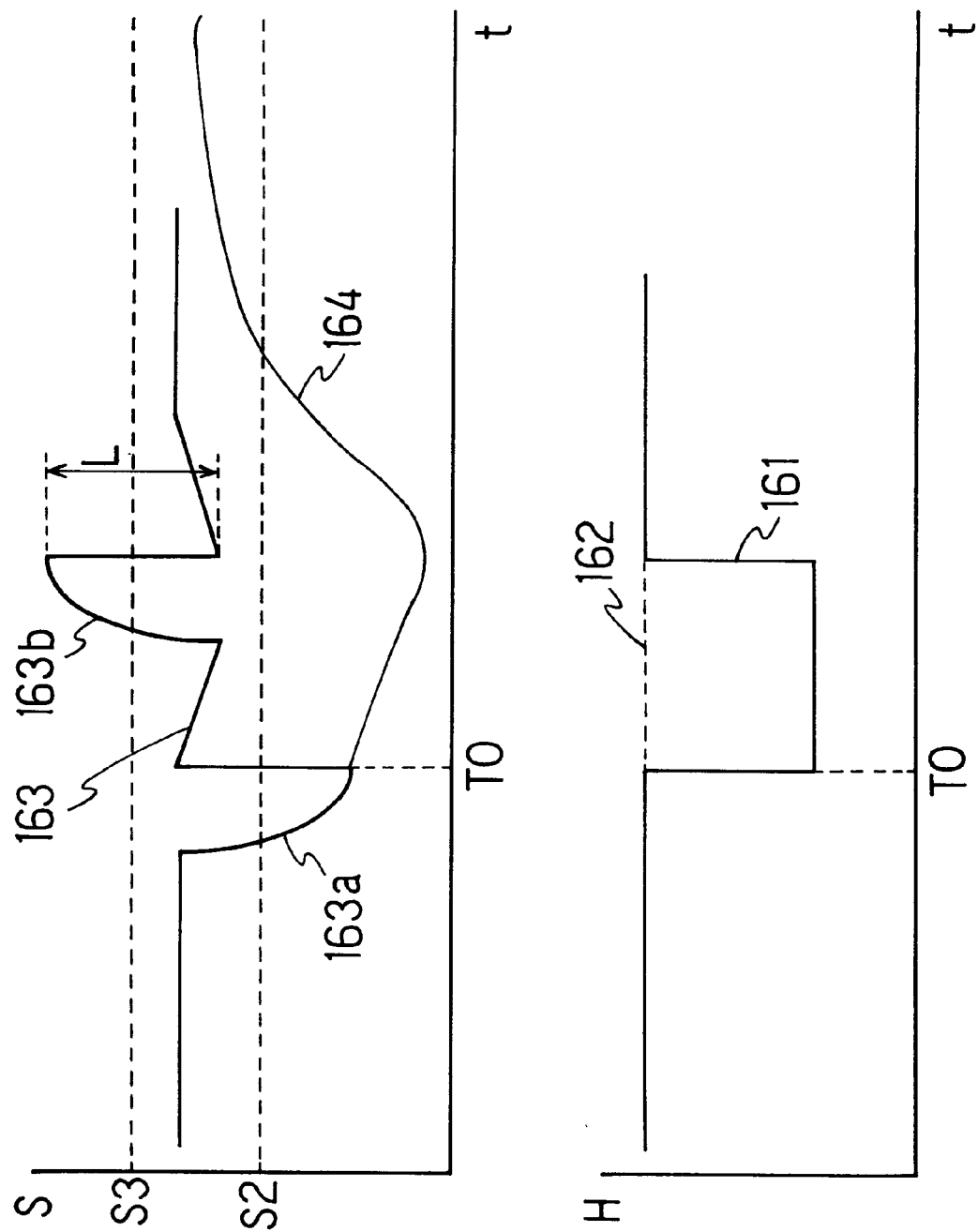

METHOD FOR READING MAGNETIC SUPER RESOLUTION TYPE MAGNETO-OPTICAL RECORDING MEDIUM

FIELD OF THE INVENTION

This invention relates to an optical recording medium used for recording and reading of information, and to a recording/reading method for such a recording medium. This invention can be applied to optical information, acoustical information, computer data, or multimedia files that combine these types of information.

BACKGROUND OF THE INVENTION

In recent years, recording media such as CD, LD, MD, 3.5" data files, 5.25" data files and PD have achieved practical use as a recording medium for optical information, acoustical information, or computer data and the like. In the course of our progress towards information society, an optical recording/reading medium that combines high density, high capacity, and high speed is in demand. In this respect, a magneto-optical recording medium with a magnetic induction type super resolution technique has caught attention as a technique that exceeds the resolution of a light beam, and is expected to become a core technology for future high density optical recording media. Suggestions concerning this matter can be found in the Publication of Unexamined Patent Application Nr. Hei 03-242845 among others. Furthermore, it has been suggested to achieve an even higher density for recording/reading, through combined use of the super resolution technique and a magnetic modulation recording technique, which allows easy recording of micro-marks. Publication of Unexamined Patent Application Nr. Hei 03-242845 also makes suggestions concerning this matter.

Referring to FIG. 19, an example of a prior art super resolution technique is explained below. First of all, the information is recorded using a known recording technique, such as light modulation or magnetic modulation. The recorded information is stored in a recording layer 7. When the information is read, the recording medium moves in arrow direction A. Preceding the reading, the magnetization of a reading layer 5 is already oriented in one direction by an initializing magnetic impression means 8. A reading beam is focused, and an irradiation domain 1 is irradiated. Together with the reading beam irradiation, the reading layer 5 is heated. When the temperature rises due to the heating, the exchange coupling force acting in the recording layer 7 and the reading layer 5 grows stronger, and a magnetic domain recorded in the recording layer 7 is transcribed into the reading layer 5 via an intermediate layer 6. Moreover, in the high temperature domain, the intermediate layer 6 exceeds the Curie point, the magnetic coupling between the recording layer 7 and the reading layer 5 is interrupted, and the magnetization of the reading layer 5 is oriented into one direction by a reading magnetic field impression means 9. In other words, in the beam irradiation domain 1, a low temperature mask domain 2 and a high temperature mask domain 3 become the masked state in order to orient the magnetization into a fixed direction unaffected by the recorded information. Hence, when the information is read, the magnetic domains of the recording layer 7 are transcribed into the reading layer 5 in an aperture domain 4 only. Consequently, it is possible to enlarge considerably the resolution, which was previously determined by the size of the light beam irradiation domain 1.

In order to improve the high resolution performance as an effect of this super resolution reading technique even further, a joint use of magnetic modulation, allowing an easy recording at higher density, has been suggested. Publication of Unexamined Patent Application Nr. Hei 03-242845 makes suggestions concerning such matter.

However, the above configuration has posed several problems, which shall be described below.

(1) When the magnetization of the aperture domain 4 of the reading layer 5 is reversed according to the magnetization of the recording layer 7, the translation of the magnetic domain wall is not that fast. For that reason, although the magnetization of the aperture domain 4 of the reading layer 5 reverses quickly in the direction of the magnetic field that is impressed by the reading magnetic field impression means 9, the reversal in the other direction becomes slow. Not only does this lead to a distortion of the reading wave form, but it also enlarges the edge shift for a mark edge recording with a higher density recording. Furthermore, if the linear velocity is raised to accelerate the transfer rate, this drawback becomes even more severe. Consequently, this poses an obstacle on the way to higher density and higher transfer rate.

(2) To initialize the magnetization of the reading layer 5 into an orientation in one direction, a large magnetic field in initializing magnetic impression means 8 is necessary.

(3) Preceding the magnetic modulation recording, anticipatory position adjustment has to be performed in order to locate the magnetic field in the focused laser spot effectively.

(4) If the temperature changed after the initialization, or tilt occurred due to humidity variation, then it was difficult to perform recording/reading/erasure with the most suitable operation power.

(5) Based on magnetic field modulation recording, overwriting is of course possible, and in the case of a high density recording, it is a great advantage that the recording power margin is very broad. This is to avoid a condition of neighboring marks resembling overlapping circles, because in magnetic field modulation recording, the recording occurs while the portion of the mark that has just been formed is repolarized. However, if a high density recording is attempted by making the track intervals narrow, then the broad recording power margin turns into a disadvantage. In other words, in the case of magnetic field modulation, even with excess recording power, the recording power is likely to be set on the higher side, in order to prevent the recording marks from turning into an overlapping circles condition. In that case, even though the overlapping circles condition could be avoided, there have been problems such as the enlargement of the recording mark, the deletion of recorded marks in neighboring tracks, or the increase of cross-talk.

(6) Hitherto, in devices for the reading of magneto-optical recordings, during short term stand-by periods for recording or reading, the focus servo and the tracking servo were operating and standing by under reading conditions. However, if the servos have to stand by under reading conditions in a magnetic super resolution type magneto-optical recording medium, which necessitates a reading magnetic field, there has been the problem of waste through dissipation of power in the electromagnet type magnetic head.

SUMMARY OF THE INVENTION

The present invention solves the above problems and aims at providing a reading method, a recording method, and a reading/recording method of an optical recording medium, a magneto-optical recording medium for position adjustment of a magnetic head, a position adjustment method of the magnetic head using that medium, and an optical recording medium, thus enabling high densities and high transfer rates when using a magnetic induction type super resolution recording medium.

To achieve these goals, a first reading method for a magneto-optical recording medium is characterized in that the magneto-optical recording medium is read while controlling the translation of magnetic domain walls by irradiating focused laser light as a reading beam in a magnetic super resolution type magneto-optical recording medium that attains a signal only from one portion of the irradiation domain of the reading beam and is provided with a recording layer and a reading layer on a substrate, and by modulating a magnetic field by using a magnetic head, which is equipped with a slider and glides or floats on the magnetic super resolution type magneto-optical recording medium. By taking the above measure, a precise reading, which is responsive to the length of the recording mark, can be performed, and high density and high transfer rate become possible.

In the first reading method for a magneto-optical recording medium, it is preferable that the magneto-optical recording medium is read while alternating, with a period equivalent to less than ½ the shortest wavelength of the recording marks, the polarity of the magnetic field between a polarity that accelerates a transcription of the magnetization of the recording layer into the reading layer and a polarity that delays a transcription of the magnetization of the recording layer into the reading layer, in a portion of the beam irradiation domain from which the reading signal is attained. By taking this measure, it is possible to attain a good response at both the beginning and the end of the recording marks.

Furthermore, it is preferable to read the magneto-optical recording medium while reversing the polarity of the reading magnetic field immediately, whenever a magnetic reversal of the reading layer is detected. By taking this measure, the signal can be read accurately, because it is possible to transcribe instantaneously the magnetization of the recording layer into the reading layer, regardless of the beginning or end of the recording mark.

Furthermore, it is preferable to attain the reading signal on the basis of an electric signal for driving the magnetic field during reading. By taking this measure, simple reading becomes possible.

In a second reading method for a magnetic super resolution type magneto-optical recording medium of the present invention, reading is performed by a reading light beam, while impressing a magnetic field with an electromagnet type magnetic head that is equipped with a slider and glides or floats on the magneto-optical recording medium that attains a signal only from one portion of the irradiation domain of the reading beam. The second reading method for a magneto-optical recording medium is characterized in that, in a stand-by state for reading, the same conditions as for a reading mode are maintained, but the driving current for the magnetic head is made smaller than in the reading state and a fixed reading magnetic field is impressed when switching from the stand-by state to the reading state.

In the second reading method for a magneto-optical recording medium it is preferable that the laser power in the stand-by state for reading is smaller than the reading power and the laser power is increased when the state of stand-by is shifted to the state of reading. By taking these measures, the dissipated power can be decreased.

Next, a third reading method for a magneto-optical recording medium of the present invention is characterized in that: two domains, i.e. a low temperature portion and a high temperature portion, are masked inside the irradiation domain of a reading beam; a double mask type super resolution magneto-optical recording medium is used, wherein the low temperature mask domain and the high temperature mask domain of a reading layer are magnetized in opposite directions by a reading magnetic field, regardless of the information stored in a recording layer; and the recorded information is read while setting the reading power so that the reading signal level stays almost the same, regardless of the orientation of the reading magnetic field.

In the third reading method for a magneto-optical recording medium, it is preferable to read the recorded information while impressing at least in the direction promoting the translation of magnetic walls a magnetic field using a magnetic head that is equipped with a slider and glides or floats on the magnetic super resolution type magneto-optical recording medium. By taking this measure, the most suitable reading power can be selected.

Next, in a first recording method for a magneto-optical recording medium, recording is performed using a magnetic head that is equipped with a slider and glides or floats on a magnetic super resolution type magneto-optical recording medium, after the magneto-optical recording medium, which attains a signal only from one portion of the irradiation domain of the reading beam, has been initialized at room temperature, polarizing the reading layer into one direction with an external magnetic field. The first recording method for a magneto-optical recording medium is characterized in that at least a range of the magneto-optical recording medium that is bigger than the domain formed by the recording marks is already polarized in the same orientation as the initialization at the reading time. By adopting this recording method, the recording magnetic field necessary for initialization can be reduced.

Next, in a second recording method for a magneto-optical recording medium, a signal is recorded while, according to the signal to be recorded, a magnetic field is modulated with a magnetic head that is equipped with a slider and glides or floats on a magnetic super resolution type magneto-optical recording medium that attains a signal only from one portion of the irradiation domain of the reading beam. The second recording method for a magneto-optical recording medium is characterized in that in an operation to perform a test-writing preceding the recording, a deletion operation is performed by irradiating continuous light while impressing a constant deletion magnetic field; after the deletion operation, test-writing is performed with a mark pitch that is smaller than a track pitch, while changing the power for recording through light modulation; and a recording power avoiding a condition of the recording marks resembling overlapping circles is determined through the test-writing. By adopting such a recording method, it is possible to prevent an increase of cross-talk or deletion of marks in neighboring tracks.

In the second recording method for a magneto-optical recording medium, it is preferable that: information is recorded with a magnetic field that is modulated according to the information to be recorded, using a light pulse with a constant period T1 that is synchronized to the clock signal; after the deletion operation, in a constant magnetic field pointing in the opposite direction of the deletion magnetic field or in an alternating field with a period T2 (with 2 T1≧T2>T1), the recording is performed through a light pulse with a period T2, which is synchronized to the clock signal, matching the timing with which a magnetic field is impressed in the opposite direction of the deletion magnetic field while the light amount of the recording light pulse is changed; the most suitable light amount is sought on the basis of the result of reading; and the recording is performed with the most suitable light amount, using a modulation magnetic field carrying the information to be recorded and a light pulse with the period T1.

In a disk-shaped magneto-optical recording medium for position adjustment of a magnetic head of the present invention, the magnetization direction of a portion of a reading layer in the irradiation domain of a reading beam is determined by an external field. The disk-shaped magneto-optical recording medium for position adjustment of a magnetic head is characterized in that the magneto-optical recording medium has an eccentricity of more than 50 μm. In such a recording medium, precise position adjustment can be performed easily.

It is preferable that the disk-shaped magneto-optical recording medium for position adjustment of a magnetic head comprises a reading layer, an intermediate layer, and a recording layer on a substrate, and that the Curie point of the intermediate layer is set lower than the Curie points of the reading layer and the recording layer.

Next, in a method for position adjustment of a magnetic head of the present invention, the magnetization direction of a portion of a reading layer in the irradiation domain of a reading beam is determined by an external field and a disk-shaped magneto-optical recording medium is used that has an eccentricity of more than 50 μm. The method for position adjustment of a magnetic head is characterized in that: when the position of laser irradiation and the position of the magnetic field impression are matched, a focus servo and a tracking servo for the focused laser light in the rotating magneto-optical recording medium are operated, and a device is used to record or read while modulating focused laser light and a magnetic field with a magnetic head that is equipped with a slider and glides or floats on the magneto-optical recording medium; and the magnetic head is adjusted to the most suitable position by observing the reading signal while the magnetic head is moved over the surface of the magneto-optical recording medium, and the modulated magnetic field is impressed. By adopting such a method for position adjustment, precise position adjustment can be performed easily.

In the method for position adjustment of a magnetic head, it is preferable that a reading layer, an intermediate layer, and a recording layer are disposed on a substrate of the optical recording medium, and the Curie point of the intermediate layer is set lower than the Curie points of the reading layer and the recording layer.

An optical recording medium, comprising a recording layer and a reading layer on a substrate and in which binary information expressed by "1"s and "0"s is recorded in the recording layer, is characterized in that: the optical recording medium has at least two different temperature domains, the two temperature domains being a first temperature domain wherein the optical characteristics of the reading layer change responding to the information stored in the recording layer, and a second temperature domain wherein the optical characteristics of the reading layer are constant regardless of the information stored in the recording layer; either the first temperature domain or the second temperature domain includes room temperature, the other temperature domain being higher than room temperature; the reading is performed while the first temperature domain and the second temperature domain are coexistent in the irradiation domain of the reading beam; and in the recording layer, the optical recording medium has a power calibration domain where only "1"s or "0"s are recorded in periodically fixed sections.

It is preferable that the above optical recording medium according, comprises a power calibration domain in each smallest recording unit.

Furthermore, it is preferable that in the above optical recording medium, a relationship between a critical reading power and at least one recommended operating power of the operating powers for recording, reading and deletion, or the information to calculate the relationship is stored in an administrative area. In such an optical recording medium, it is possible to perform recording/reading/deletion with the most suitable operating power, even if the temperature varies from the temperature at initialization time, or if tilt occurs due to humidity variations.

Next, a recording/reading method for an optical recording medium of the present invention is characterized in that: the optical recording medium comprises a recording layer and a reading layer on a substrate; binary information expressed by "1"s and "0"s is recorded in the recording layer; the optical recording medium has at least two different temperature domains, the two temperature domains being a first temperature domain wherein the optical characteristics of the reading layer change responding to the information stored in the recording layer, and a second temperature domain wherein the optical characteristics of the reading layer are constant regardless of the information stored in the recording layer; either the first temperature domain or the second temperature domain includes room temperature, the other temperature domain being higher than room temperature; the reading is performed while the first temperature domain and the second temperature domain are coexistent in the irradiation domain of a reading beam; the optical recording medium has a power calibration domain in the recording layer, wherein only "1"s or "0"s are recorded in periodically fixed sections; the reading is performed while successively changing the reading power in the power calibration domain; a critical reading power, at which the inside of the reading beam irradiation turns from the condition of either an exclusive first temperature domain or an exclusive second temperature domain into the condition of two coexistent temperature domains, or at which the condition of two coexistent temperature domains turns into the condition of either an exclusive first temperature domain or an exclusive second temperature domain, is sought; and based on the result, at least one operating power of the operating powers for recording, reading and deletion is set.

In the above recording/reading method for an optical recording medium, it is preferable that the critical reading power is sought using the time from the beginning of the increase in the reading power to the occurrence of a gate signal, when the inside of the reading beam irradiation turns from the condition of either an exclusive first temperature domain or an exclusive second temperature domain into the condition of two coexistent temperature domains, or the time to the occurrence of a gate signal, when the condition of two coexistent temperature domains turns into the condition of either an exclusive first temperature domain or an exclusive second temperature domain. By adopting the above recording/reading method, it is possible to perform recording/reading/deletion with the most suitable operating power, even if the temperature varies from the temperature at initialization time, or if tilt occurs due to humidity variations.

BRIEF DESCRIPTION OF THE DRAWINGS

FIGS. 10A–E are explanatory drawings of the operation in the data recording mode and in the test-writing mode in a preferred embodiment of the present invention.

FIGS. 16A–B are explanatory drawings of the operation of a reading magnetic field and a reading signal in a preferred embodiment of the present invention.

DETAILED DESCRIPTION OF THE INVENTION

The following is an explanation of a preferred embodiment of the present invention, divided into pre-treatment of the magneto-optical recording medium, adjustment of the magnetic head, setting of the reading power, setting of the recording power, and a method for impression of the reading magnetic field.

(I) Pre-treatment of the Magneto-optical Recording Medium

Figure 1:
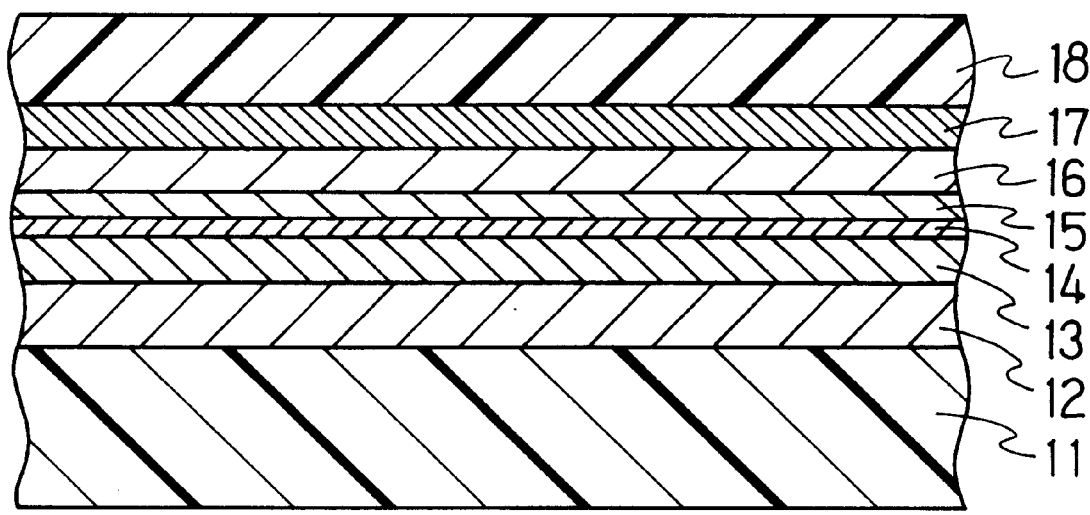
FIG. 1 is a structural drawing of the recording medium used in a preferred embodiment of the present invention.
Figure 2:
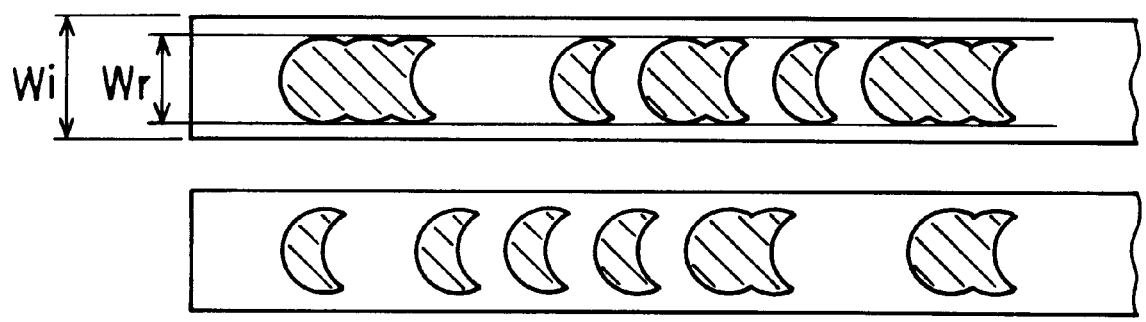
FIG. 2 shows a recorded magnetic domain arrangement according to a preferred embodiment of the present invention.

First of all, an example of the pre-treatment of the magneto-optical recording medium is explained using FIG. 1 and FIG. 2. This example allows decreasing the magnetic field during initialization. FIG. 1 shows the structure of the magneto-optical recording medium used in this example. In FIG. 1, 11 is a substrate, 12 is a dielectric film, 13 is a reading layer, 14 is an intermediate layer, 15 is a supplementary layer, 16 is a recording layer, 17 is a protection layer, and 18 is an overcoat layer. The layers from the reading layer 13 to the protection layer 17 are formed successively through sputtering film formation on the substrate, and the overcoat layer is formed subsequently through spin coating.

Next, the pre-treatment of a magneto-optical recording medium with such a construction is explained. The pre-treatment is performed with magnetic field modulation after preparation of the magneto-optical recording medium, and before the recording of data. In this example, it is advantageous that a magnetic head is used for the recording, equipped with a slider and gliding or floating on the magnetic super resolution type magneto-optical recording medium, which attains a signal only from one portion of the irradiation domain of the reading beam, and after an initialization is performed at room temperature, magnetizing the reading layer in one direction with an external magnetic field. To be concrete, preceding the recording, a range wider than the domain formed by at least the recording marks of the magneto-optical recording medium is already polarized in the same direction as the initialization at the reading time. In other words, as can be seen from the recorded magnetic domain arrangement of FIG. 2, a magnetic field is applied in the same direction as the initialization magnetic field at the reading time, over the range of Wi, which is wider than the recording width Wr of a recorded magnetic modulation. In this example, the pre-treatment was performed through photo-thermal magnetic recording, using a focus servo and a tracking servo operated with a constant laser power that was up to 20% bigger than during the recording of the magnetic modulation, while the recording magnetic field was facing in the same direction as the initialization magnetic field at the reading time. By doing so, of the two types of magnetic domains (upwards oriented and downwards oriented) formed through recording with magnetic field modulation, all the magnetic domains that have to be reversed through the initialization can be formed as isolated recording marks afterwards. As a result, it was possible to cut the recording magnetic field necessary for initialization in half. In a test sample that has not been subjected to initialization, an initialization field of 7 kilo-oersted was necessary for long marks with 4 μm mark length. On the other hand, through the introduction of the pre-treatment according to the present example, an initialization with 4 kilo-oersted was possible.

If it is necessary to arrange the orientation of the magnetization of the reading layer in only one direction at room temperature before irradiation with a reading beam, or in other words, if it is necessary to perform initialization, then the pre-treatment is an effective means for any magnetic induction super resolution recording medium recording magnetic field modulation.

Even if the operation of deletion before the recording is a conventional method in the recording of light modulation, a large magnetic field during initialization is not necessary, because the recording marks are formed in an isolated condition. However, in the recording of magnetic modulation, the concept of deletion before the recording is unconventional, because overwriting is possible. Furthermore, if the pre-treatment according to this procedure is performed once before shipment, it does not have to be repeated for every overwriting, and thus does not burden the user.

In this example, photo-thermal magnetic recording was performed as a means for the pre-treatment, as described above. A focus servo and a tracking servo were operated with constant laser power that was up to 20% bigger than during the recording of the magnetic modulation, while the recording magnetic field was facing in the same direction as the initialization magnetic field at the reading time. However, the goal was reached, because this pre-treatment produces recording marks that are formed by recording of magnetic modulation, and are initialized at the reading time in an isolated condition. Consequently, it is also advantageous that eventually a magnetic field stronger than the coercive field strength of the recording layer polarizes the entire disk surface in the initialization direction at the time of reading. Alternatively, it is also advantageous that, under a magnetic field in the initialization direction at the time of reading, a flash lamp irradiation heats up and polarizes the entire recording layer instantaneously.

(II) Adjustment of the Position of the Magnetic Head

Figure 3:
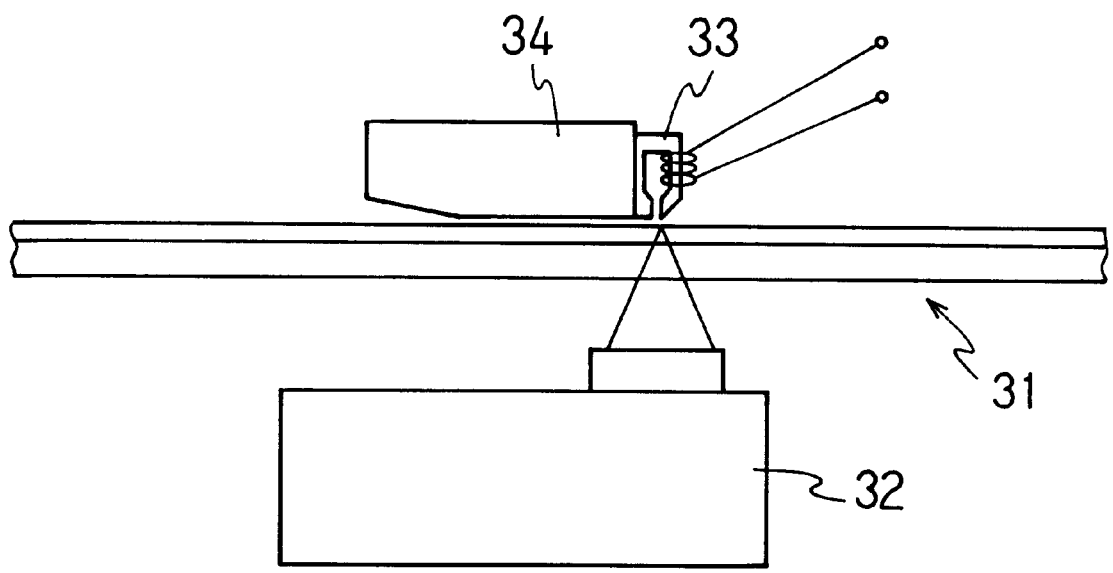
FIG. 3 is a structural drawing of the magnetic field modulation recording device used in a preferred embodiment of the present invention.
Figure 4:
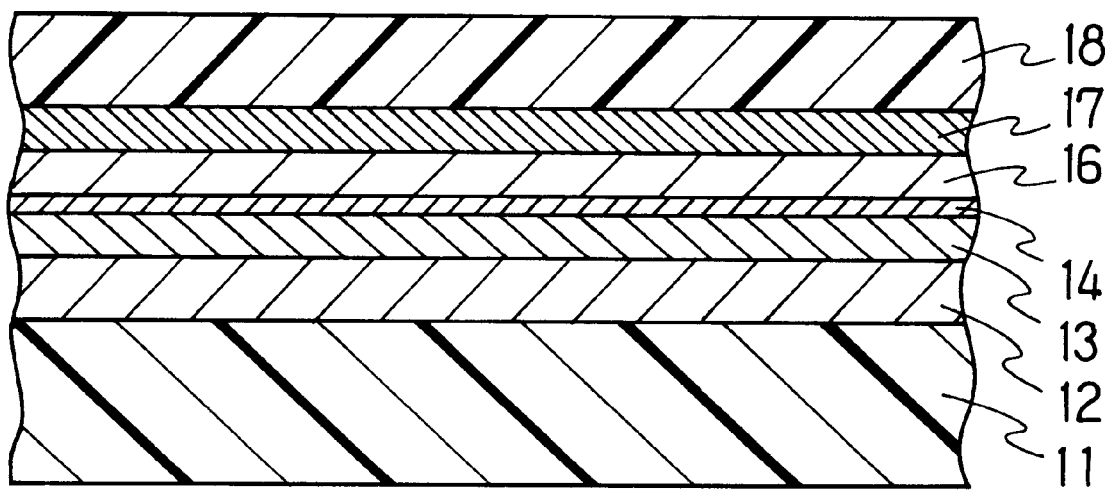
FIG. 4 is a structural drawing of the disk-shaped recording medium for adjustment in a preferred embodiment of the present invention.
Figure 5:
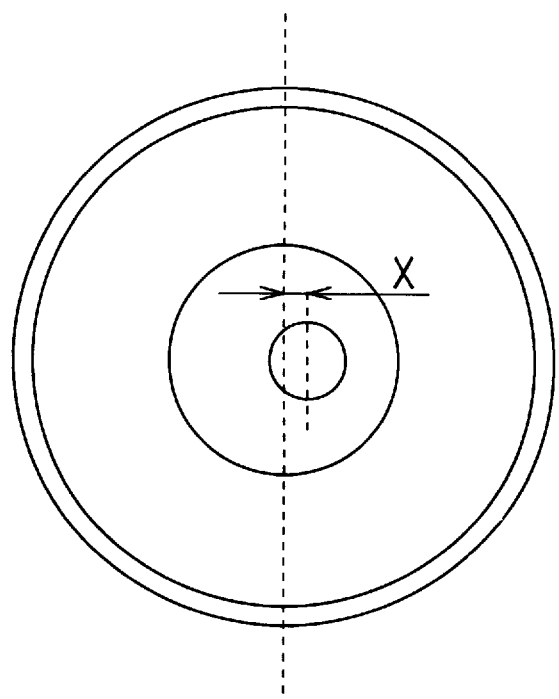
FIG. 5 is a structural drawing of the disk-shaped recording medium for adjustment in a preferred embodiment of the present invention.

Next, an example of the adjustment of the position of the magnetic head is explained using FIGS. 3 to 5. Generally, in the case of a magnetic field modulation recording, a device with a structure such as shown in FIG. 3 is used. In FIG. 3, 31 is a magneto-optical recording medium, 32 is an optical head, 33 is a magnetic head, and 34 is a slider. In order to modulate the magnetic field rapidly, the magnetic head for magnetic field modulation recording is small and the effective range of the magnetic field applied by magnetic head 33 is even smaller. Therefore, preceding the magnetic field modulation recording, a position adjustment is performed to locate the magnetic field in the focused laser spot effectively.

Below, a method for effective position matching of the magnetic head and the optical head is explained. The method for effective position matching of the magnetic head and the optical head that has been performed in this example is advantageous to match the laser irradiation position with the magnetic field impression position in a device for recording or reading while the magnetic field is modulated using a focused laser and a magnetic head, which is equipped with a slider and glides or floats on the magneto-optical recording medium. In this example, the magnetization direction of a portion of the reading layer covering at least the irradiation domain of the reading beam is determined by an external magnetic field. Furthermore, a disk-shaped magneto-optical recording medium is used, having an eccentricity of more than 50 $\mu$m. While this magneto-optical recording medium is rotated, the focus servo and the tracking servo of the focused laser light are operated, and the magnetic head is adjusted into the most suitable position by observing the reading signal while the magnetic head is moved along the surface of the magneto-optical recording medium and the modulated field is impressed.

FIG. 4 shows the disk-shaped recording medium for adjustment, as according to this example. On a substrate 11, a dielectric film 12, a reading layer 13, an intermediate layer 14, a recording layer 16, a protection layer 17, and an overcoat layer 18 are formed successively. The Curie point of the intermediate layer 14 is set lower than the Curie points of both the reading layer 13 and the recording layer 16, so that only the intermediate layer 14 rises above the Curie point in a portion of the beam irradiation domain at the reading time, and the exchange coupling between the reading layer 13 and the recording layer 16 is interrupted. Consequently, when the exchange coupling between the reading layer 13 and the recording layer 16 is interrupted, the polarization of a portion of the reading layer 13 is determined by an external magnetic field. The use of an optical recording medium with such a structure, simply in order to adjust the position of the magnetic head, has been suggested in Publication of Unexamined Patent Appl. Nr. Hei 08-017090, and is thus well known. In the present example, the magneto-optical recording medium differs from the prior art, in that the deviation of the track center from the center of the center hole, i.e. the eccentricity X, exceeds 50 $\mu$m, as is shown in FIG. 5. The reason why the eccentricity X exceeds 50 $\mu$m is that in a conventional optical recording medium, a maximum eccentricity of 50 $\mu$m is the standard, and for any recording medium within this standard it is necessary to make sure that there is no problem with a larger eccentricity in order to impress a magnetic field effectively. If such a recording medium is used, then the laser beam sways over at least 100 $\mu$m in a radial direction relative to the recording medium, when the focus and the tracking servo move the focused laser beam over the recording medium. Moreover, if eccentricity X is inside the range followed by the tracking servo, then the tracking servo will not operate smoothly if this range is too big. Because the tracking servo becomes unstable when the regular eccentricity is over 150 $\mu$m, an eccentricity X in the range 50–150 $\mu$m is preferable.

With the focus and the tracking servo in operation, the optical recording medium shown in FIG. 4 is read while impressing a modulated magnetic field with a magnetic head 33, which is equipped with a slider and glides or floats on the recording medium, and the reading signal is attained only from the portion of the beam irradiation domain in which the reading layer 14 is above the Curie point. Because the focused beam sways over at least 100 $\mu$m due to the eccentricity of the recording medium, a position of the magnetic head covering at least a range of 100 $\mu$m effectively can be easily found by moving the magnetic head in a radial direction relative to the recording medium. By subsequently moving the magnetic head in a circumferential direction relative to the recording medium, it is possible to find the most suitable position and decide the magnetic head's position.

Moreover, this series of adjustments is usually performed during the assembly of the drive, but it can also be applied to resolution correction or readjustment after assembly and the like, should the need arise.

Moreover, in this example, an optical recording medium with a magnetic induction type super resolution (a so-called FAD) was used, but it is the same for a recording medium with a structure as shown in FIG. 1. In other words, it is possible to use a disk-shaped magneto-optical recording medium having an eccentricity of more than 50 $\mu$m in which the magnetization of at least the portion of the reading layer in the irradiation domain of the reading beam is determined by an external field.

(III) Setting the Magneto-optical Recording Medium and its Reading Power

Next, an example of the method of setting of the magneto-optical recording medium and its reading power is explained using FIGS. 6–9. It is a goal of this example to perform recording/reading/deletion with the most suitable operating power, even if the temperature varies from the temperature at initialization time, or if tilt occurs due to humidity variations and the like.

The optical recording medium according to this example has at least a recording layer and a reading layer on a substrate, and in the recording layer binary information is stored, represented by "1"s and "0"s. The optical recording medium according to this example is further characterized in that:

(a) The optical recording medium has at least two different temperature domains, i.e. a first temperature domain wherein the optical characteristics of the reading layer change responding to the information stored in the recording layer, and a second temperature domain wherein the optical characteristics of the reading layer are constant, regardless of the information stored in the recording layer.

(b) Either the first temperature domain or the second temperature domain includes room temperature, the other temperature domain being higher than room temperature.

(c) The reading is performed while the first temperature domain and the second temperature domain are coexistent in the irradiation domain of the reading beam.

(d) The optical recording medium has a power calibration domain in the recording layer of the optical recording medium, wherein only "1"s or "0"s are recorded periodically in fixed sections.

Figure 6:
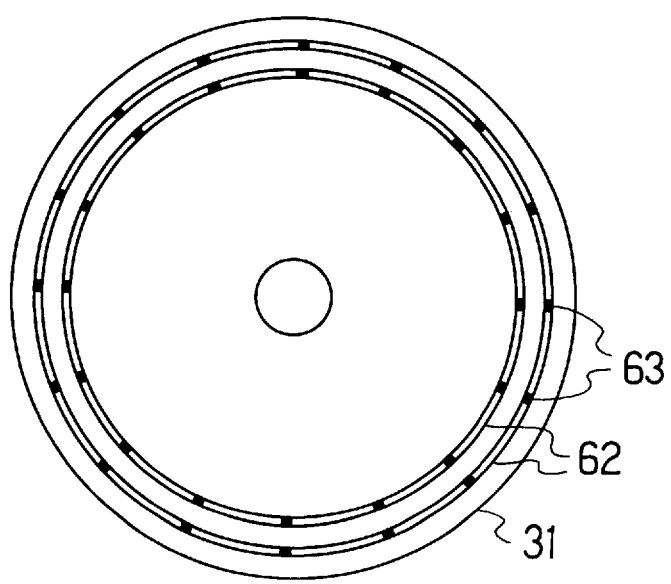
FIG. 6 is a structural drawing of the disk-shaped recording medium for adjustment in a preferred embodiment of the present invention.

With the help of the drawings, the specific aspects are explained below. In FIG. 6, 31 is an optical recording medium, 62 are recording tracks, and 63 are power calibration domains, wherein only "1"s or "0"s are recorded in periodically fixed sections. These are employed in each sector constituting a minimal recording unit. The recording medium comprises at least a substrate, a recording layer and a reading layer, and binary information, represented by "1"s and "0"s, is stored in the recording layer. The optical recording medium used in this example is formed in succession by a substrate, a dielectric film, a reading layer, a supplementary layer, a recording layer, a protection layer, and an overcoat layer.

Figure 7:
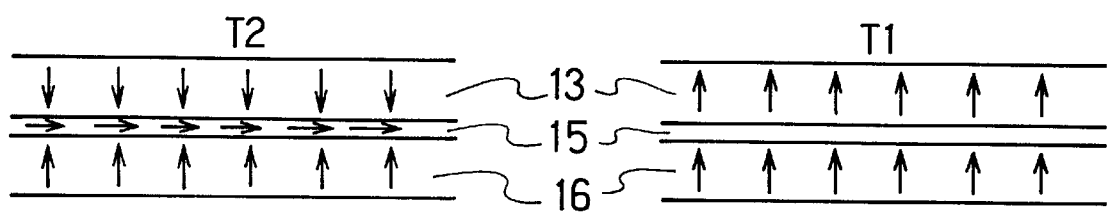
FIG. 7 is an explanatory drawing of the magnetization conditions in a power calibration domain portion in a preferred embodiment of the present invention.

As is shown in FIG. 7, in a portion of the power calibration domain, the recording layer 16 is magnetized in an upwards direction throughout the figure, a magnetic domain wall is formed by the supplementary layer 15, and in a second temperature domain T2 including room temperature, the reading layer is magnetized in a downward direction. This can be realized easily by forceful orientation in a downward direction with an external initializing magnetic field, and consequently the optical characteristics of the reading layer, i.e. the direction of the Kerr rotation, are constant regardless of the information stored in the second temperature domain T2.

On the other hand, in the heated first temperature domain T1, the coercive field strength of the reading layer 13 drops whereas the exchange coupling force between the recording layer 16 and the reading layer 13 rises, and the magnetization of the recording layer 16 is transcribed. As a result, the magnetization of the reading layer 13 follows the magnetization of the recording layer 16. In other words, the optical characteristics, i.e. the orientation of the Kerr rotation of the reading layer, change according to the information stored in the first temperature domain T1 in the recording layer.

The power calibration performed in this example, which uses the previously described optical recording medium has the following characteristics:

(a) The reading is performed while successively changing the reading power in the previously described power calibration domain, (b) Inside the irradiation of the reading beam, a critical reading power is sought, at which the condition of either an exclusive first temperature domain or an exclusive second temperature domain turns into the condition of two coexistent temperature domains, or at which the condition of two coexistent temperature domains turns into the condition of either an exclusive first temperature domain or an exclusive second temperature domain, and based on the result, the operation power is set for at least one of recording, reading, or deletion.

Figure 8A:
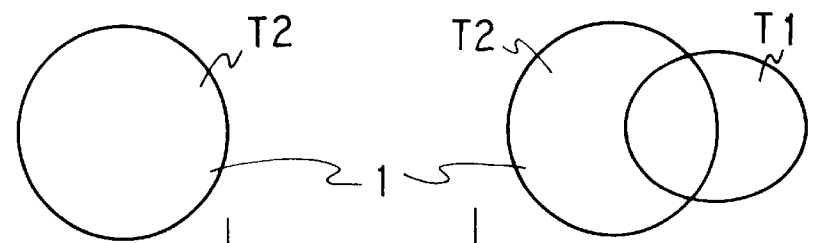
FIGS. 8A–D show the reading signal of a power calibration domain portion in a preferred embodiment of the present invention.

The situation will be explained in more detail with reference to the drawings. FIG. 8A shows the relationship between a reading beam irradiation domain 1 and the two temperature domains, FIG. 8B shows the transient change of laser power P until the reading power setting at the reading time is reached, FIG. 8C shows the reading signal S, which is attained in the optical head, and FIG. 8D shows the transient change of laser power P until the recording power setting at the recording time is reached.

Figure 8B:
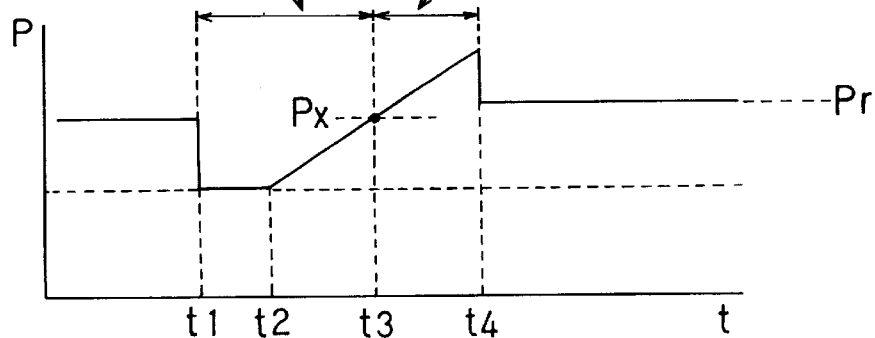
Figure 8C:
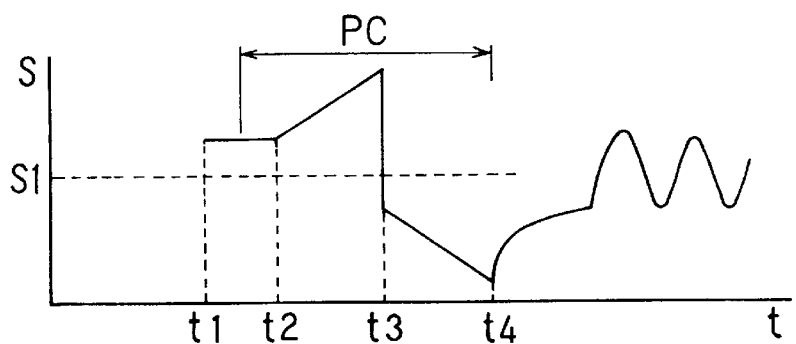
Figure 8D:
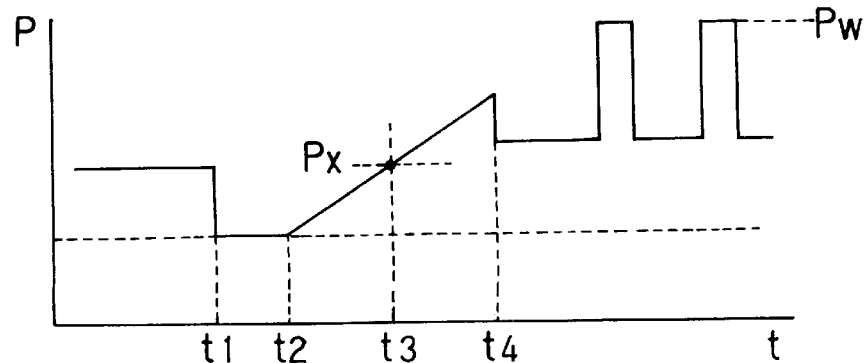

The reading power in power calibration domain PC is gradually increased, as is shown in FIG. 8B. However, directly before the increase of power, during the interval t1–t2, a turn-off period of 150 ns is provided, in order to avoid the residual heat brought about by the previous reading power irradiation. Considering the cooling time for a laser irradiated recording medium, this turn-off period should be longer than 100 ns. However, if the turn-off period is chosen to be too long, then the utilization rate as a recording medium drops, and the stability of the servos is harmed. Thus a turn-off period of under 1 $\mu$s is suitable. From t2 to t4, the reading power in power calibration domain PC is gradually increased. In the interval t2–t3, the extent of the irradiation domain 1 of the reading beam is equal to the second temperature domain T2, as is shown in FIG. 8A. However, from t3–t4, the irradiation domain 1 turns into a coexistence of second temperature domain T2 and first temperature domain T1. At this moment, the reading signal changes abruptly in t3, as is shown in FIG. 8C. Consequently, it is possible to specify the interval t2–t4 and, using a gate signal only open in the moment passing through the power calibration domain PC as well as a reference signal S1, to specify the interval t2–t3. This interval responds to sensitivity variations occurring caused by variations of the optical head, sensitivity variations and focus deviation of the recording medium, or tilting of the optical medium or the optical head and the like. Consequently, discerning the interval t2–t3 is equivalent to seeking the critical reading power, at which the condition of either an exclusive first temperature domain or an exclusive second temperature domain turns into the condition of two coexistent temperature domains.

Consequently, at the moment when the recording medium is inserted into the drive, it is possible to seek with the above described method the critical reading power simultaneously with seeking the most suitable power for reading power, recording power, deletion power and the like, using test domains on the recording medium, and to seek the relationship between the critical reading power and the various operating powers. According to the method described above, it is possible to perform recording/reading/erasure with the most suitable operation power, even if the temperature changes after the initialization or tilt occurs due to humidity variations, because it is possible to detect the critical reading power Px for each sector constituting the smallest recording unit.

As this example shows, the reading power Pr after t4 is appropriately set proportional to the interval t2–t3, which is equivalent to the critical reading power Px. Similarly, in the case of recording as shown in FIGS. 8A–D, the recording power Pw after t4 is appropriately set proportional to Px. A result of recording/reading with these measures was that a stable recording/reading/deletion, unaffected by light modulation recording or magnetic field modulation recording, was possible even for variations in temperature between 20° C. and 60° C., or variations in humidity between 40% and 80%.

Furthermore, because the relationship between the critical reading power and the various operating powers is an inherent characteristic of the recording medium, it is advantageous to record in an administrative area the relationship between the critical reading power and a recommended operating power for at least one of recording, reading and deletion, or the information to compute these relationships. However, in this case, the manufacturer of the recording medium and the manufacturer of the drive have to agree upon such matters as the linear velocity and the alteration velocity in the power calibration domain, and it is necessary to revise the conditions for recording/reading in practice.

Furthermore, an example was explained, in which room temperature is included in the second temperature domain T2, and the first temperature domain T1 is higher than that. However, the present invention is not limited to this, and the case wherein room temperature is included in the first temperature domain T1, and the second temperature domain T2 is higher than that, as is shown in FIG. 9, is also valid.

Figure 9:
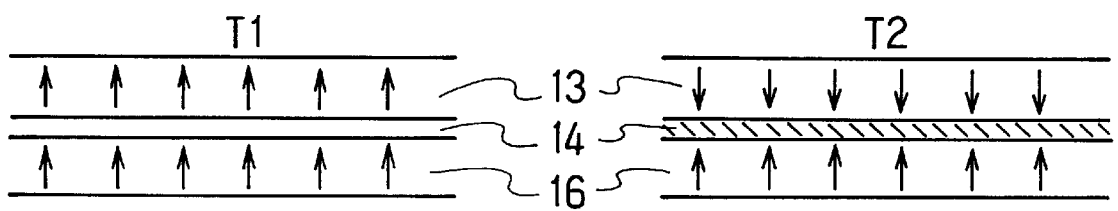
FIG. 9 is an explanatory drawing of the magnetization conditions in a power calibration domain portion in a preferred embodiment of the present invention.

In this case, as shown in FIG. 9, the recording layer 16 is magnetized uniformly upwards in a portion of the power calibration domain, and the reading layer 13 is also magnetized upwards, via the intermediate layer 14, in the first temperature domain T1, which includes room temperature.

On the other hand, the exchange coupling force between the recording layer 16 and the reading layer 13 is interrupted, because the temperature of the intermediate layer 14 rises above the Curie point in the heated second temperature domain T2, and the magnetization of the reading layer 13 is forced downwards by an external magnetic field, regardless of the magnetization of recording layer 16.

In other words, the optical characteristics, i.e. the orientation of the Kerr rotation of the reading layer, change according to the information stored in the first temperature domain T1, which includes room temperature in the recording layer 16. On the other hand, the optical characteristics of the reading layer, i.e. the orientation of the Kerr rotation, are constant regardless of the information stored in the recording layer 16 in the second temperature domain T2.

It is possible to apply the present invention to such a recording medium, and to find the critical reading power for each sector constituting a minimal recording unit with exactly the same procedure.

Furthermore, the present invention is also valid for a super resolution recording medium using a thin film with reflectivity and transmissivity varying for example with temperature and not by inducing a magnetic field.

Moreover, in this example, the reading power in the power calibration domain was gradually increased, but the critical reading power can also be found by reading while gradually decreasing the reading power. In that case, the critical reading power becomes the reading power at which the condition of two coexistent temperature domains turns into the condition of either an exclusive first temperature domain or an exclusive second temperature domain. However, considering the difference between the heating speed and the cooling speed of the recording medium, because the former one is faster, it is preferable that the reading power is gradually increased.

Moreover, in this example, the reading power in the power calibration domains changed continuously, i.e. in an analog manner. Yet the same effect can be attained, even if the change is made discontinuously, i.e. in a digital manner.

Moreover, in this example, previous to changing the reading power in the power calibration domains gradually, a turn-off period for the laser was provided, but this is not necessarily required, and the operating power can be computed by using a suitable compensational term.

(IV) Setting the Recording Power

Next, an example of a method to seek the most suitable recording power for a recording medium as used in this example is discussed.

In conventional magnetic field modulation recording, overwriting can be performed easily, in comparison to optical modulation recording, and in the case of a high density recording, it is a great advantage that the recording power margin is very broad. For example, in the case of optical modulation recording, neighboring marks are recorded independently, if the most suitable recording power is applied. However, when the recording power becomes excessive, the neighboring marks eventually turn into a condition resembling overlapping circles. In magnetic field modulation recording on the other hand, the overlapping circles condition for neighboring marks does not occur, because a portion of the marks that have just been formed is recorded while being repolarized.

However, if the track interval is made small, and high density recording is attempted, then the recording power margin actually turns out to be a problem. For example, in the case of magnetic field modulation, even with excessive recording power, the recording marks do not turn into an overlapping circles condition, as has been noted above. Therefore, the recording power tends to be set on the high side. However, in this case, even if the overlapping circles condition can be avoided, it invites problems such as the enlargement of the recording marks, the deletion of recorded marks by neighboring tracks, or the increase of cross-talk. The present example, which solves the above mentioned problems and can be used in a method of recording while modulating a magnetic field according to the signal to be recorded by use of a electromagnet type magnetic head, which is equipped with a slider and glides or floats on the magnetic super resolution type magneto-optical recording medium, which attains a signal only from one portion of the irradiation domain of the reading beam, is characterized in that:

(a) Preceding the recording, a test-writing is performed.

(b) The test-writing is performed with a mark pitch smaller than the track pitch, while the recording power is changed through light modulation, and after a deletion operation has been performed by irradiating continuous light under a constant deletion magnetic field.

(c) A suitable recording power is determined that is small enough not to lead to a drop of the reading signal accompanying recording marks resembling overlapping circles.

(d) Based on a suitable recording power for the light modulation recording, the magnetic field modulation recording is performed.

This example is explained below, using the drawings. FIG. 10A shows the dependency of the reading signal from the recording power with magnetic field modulation and optical modulation respectively, FIG. 10B shows the waveform of the light pulse of a magnetic field modulation recording when data is recorded, FIG. 10C shows a modulation magnetic field driving waveform, FIG. 10D shows the waveform of the light pulse of a magnetic field modulation recording when test-writing is performed, and FIG. 10E shows the recording mark pattern attained by the test-writing, wherein Tr1 and Tr2 mark the centers of the respective neighboring tracks, TP is the track pitch, and MP is the mark pitch.

In this example, a magnetic induction type super resolution recording medium, as shown in FIG. 1, with a track pitch of 0.8 μm was used as a recording medium. When data is recorded in this recording medium, the recording is performed by a light pulse with a constant period T1, as is shown in FIG. 10. B, synchronized with a clock signal, under a modulation magnetic field that is proportional to the information to be recorded. The present example is characterized in that, preceding the recording, the most suitable recording power is set by an optical modulation recording. A method to set the most suitable recording power is described below.

First of all, a partial deletion is performed, that can be regarded as the test-writing. This is performed by the same method as conventional deletion, i.e. by irradiating laser light with constant power under a constant magnetic field. Next, the recording is performed through a light pulse with a period T2, which is synchronized to the clock signal, as is shown in FIG. 10D, matching the timing, with which a magnetic field is impressed in the opposite direction of the deletion magnetic field in a constant magnetic field or in an alternating field with a period T2 (with 2 T1≧T2>T1), as shown in FIG. 10C, in the opposite direction of the deletion magnetic field. In this example, the latter method was used.

By doing so, the recording marks as shown in FIG. 10E are formed. What has to be kept in mind here, is that if the recording power is increased, the recording marks will become bigger as well. Consequently, if the recording power exceeds a certain value, then the neighboring marks will turn into a condition resembling overlapping circles, and the recording signal drops. In order to prevent this, the recording power has to be set under a certain value, at which the neighboring marks do not turn into a overlapping circles condition. Therefore, it is necessary to perform the test-writing with a mark pitch MP that is at least smaller than the track pitch TP. During the test-writing, the dependence of the reading signal level S on the recording power is as shown by optical modulation recording OPr in FIG. 10A. Here, the recording power Pw, where for example the signal amplitude is the greatest, is detected and is made the recording power when information is recorded.

The recording power when recording information is achieved through a light pulse with the constant period T1 that has been synchronized to the clock signal, as shown in FIG. 10B, and through the recording of a magnetic field that is modulated according to the information to be recorded, with a gliding or floating magnetic head that is equipped with a slider. The reading level S at this time has the characteristics as shown by magnetic field modulation recording MGr in FIG. 10A, and it is possible to control the width of the recording marks, because the input of more power than is necessary can be avoided by recording with recording power Pw. In this example, the pulse width at the data recording time shown in FIG. 10B was the same as the pulse width of the test-writing shown in FIG. 10D, and the pulse period T1 was set to 2 times T2. By doing so, it was possible to record for a track pitch under 0.8 μm, not only the deletion rate of simple overwriting, but without problems like cross-talk, deletion of neighboring tracks, even when the environmental temperature at the recording time varies between 20° C. and 50° C.

Furthermore, performing a test-writing with light modulation merely to make the recording width constant, and recording of the data with magnetic field modulation is suggested in Publication of unexamined Patent Appl. Nr. Hei 8-7383, and thus is publicly known. However, in this public known example the recording width is made constant merely to improve the overwriting deletion characteristics. As opposed to that, this example aims especially at high density, and for the first time it is advantageous to make the recording width small by test-writing with a mark pitch that is smaller than the track pitch, in a magnetic super resolution type magneto-optical recording medium wherein small marks can be discriminated, by limiting the recording width in order to realize a narrow track pitch.

Furthermore, in this example, the (magnetic field modulation recording) pulse at the time of data recording, and the (optic modulation recording) pulse at test-writing have been made to differ only in their period, but in this case, because the magnetic field modulation recording pulse period is only ½ as long, the recording mark width of the magnetic field modulation recording broadens due to the residual heat effect of the preceding pulse.

In order to avoid this, it is advantageous to make corrections by e.g. enlarging the pulse width at the time of test-writing with light modulation recording, or enlarging the bias power. For the same reason, it is advantageous to set the pulse period T2 at the time of test-writing with light modulation recording in the range of 2T1≧T2>T1 with respect to the pulse period T1 of magnetic field modulation recording.

(V) Method for Impressing a Reading Magnetic Field when Shifting from Stand-by State to Reading State Next, an example of a method for impressing a reading magnetic field is explained. In conventional magneto-optical recording/reading devices, during short term stand-by periods for recording or reading, the focus servo and the tracking servo were operating, and standing by under reading conditions. However, if the servos have to stand by under reading conditions, there has been the problem of waste through dissipated power in those devices that use a electromagnet type magnetic head.

The example of a method for impressing a reading magnetic field, which uses a magneto-optical reading device performing reading in a light beam while impressing a magnetic field with a magnetic head, which is equipped with a slider and glides or floats on the magnetic super resolution type magneto-optical recording medium, which attains a signal only from one portion of the irradiation domain of the reading beam, is characterized in that:

(a) In the stand-by state for reading, the same conditions as for the reading mode are maintained, but the driving current for the magnetic head is made smaller than in the reading state, and (b) A fixed reading magnetic field is impressed, when switching from the stand-by state to the reading state.

Figures 11A, 11B, 11C:
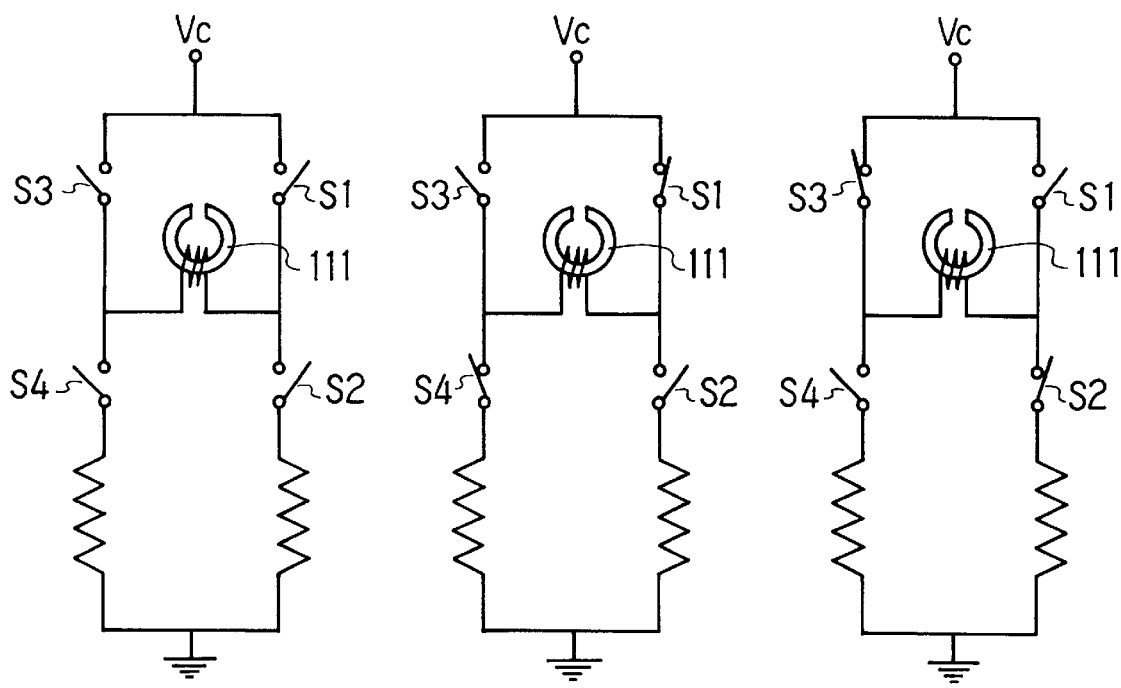
FIGS. 11A–C are explanatory drawings of the operation of the driving circuit of the magnetic head in a preferred embodiment of the present invention.

Below, the situation will be explained in more detail with reference to the drawings. FIGS. 11A–C illustrate the driving circuit of the magnetic head. 111 is the magnetic head, and S1, S2, S3, and S4 are switching elements. FIG. 11A shows the condition of the circuit for the stand-by state, FIGS. 11B and C show the condition of the circuit for the reading state. The operation of the circuit is explained below. In the stand-by state, S1, S2, S3, and S4 are all in an OFF position, as is shown in FIG. 11A. In order to reach the goal of the present example, it is also valid to put only S1 and S2 in the OFF position.

Moreover, in the stand-by state, the focus servo and the tracking servo are operating and standing by, while the laser is irradiated. The laser power at this time can be the reading power, but, because the reading power of a magnetic super resolution type magneto-optical recording medium is bigger than the reading power of a conventional recording medium without super resolution, it is preferable to stand by with a reading stand-by power that is smaller than the reading power, and thus reduce the dissipated power.

When switching from the stand-by state to the reading state, the magnetic field is switched on by putting S1 and S4 in the ON position, as shown in FIG. 11B, or alternatively putting S2 and S3 in the ON position, as shown in FIG. 11C, and a predetermined current flows through the magnetic head 111. Furthermore, if the reading stand-by power is made smaller than the reading power, then the laser power is increased to the reading power, when switching from the stand-by state to the reading state.

In this example, the dissipated during stand-by could be reduced by 1.1 W compared to stand-by under reading conditions by setting the reading stand-by power to 0.7 mW, and the reading power to 2 mW, in addition to the decrease of magnetic field driving power.

Figure 12:
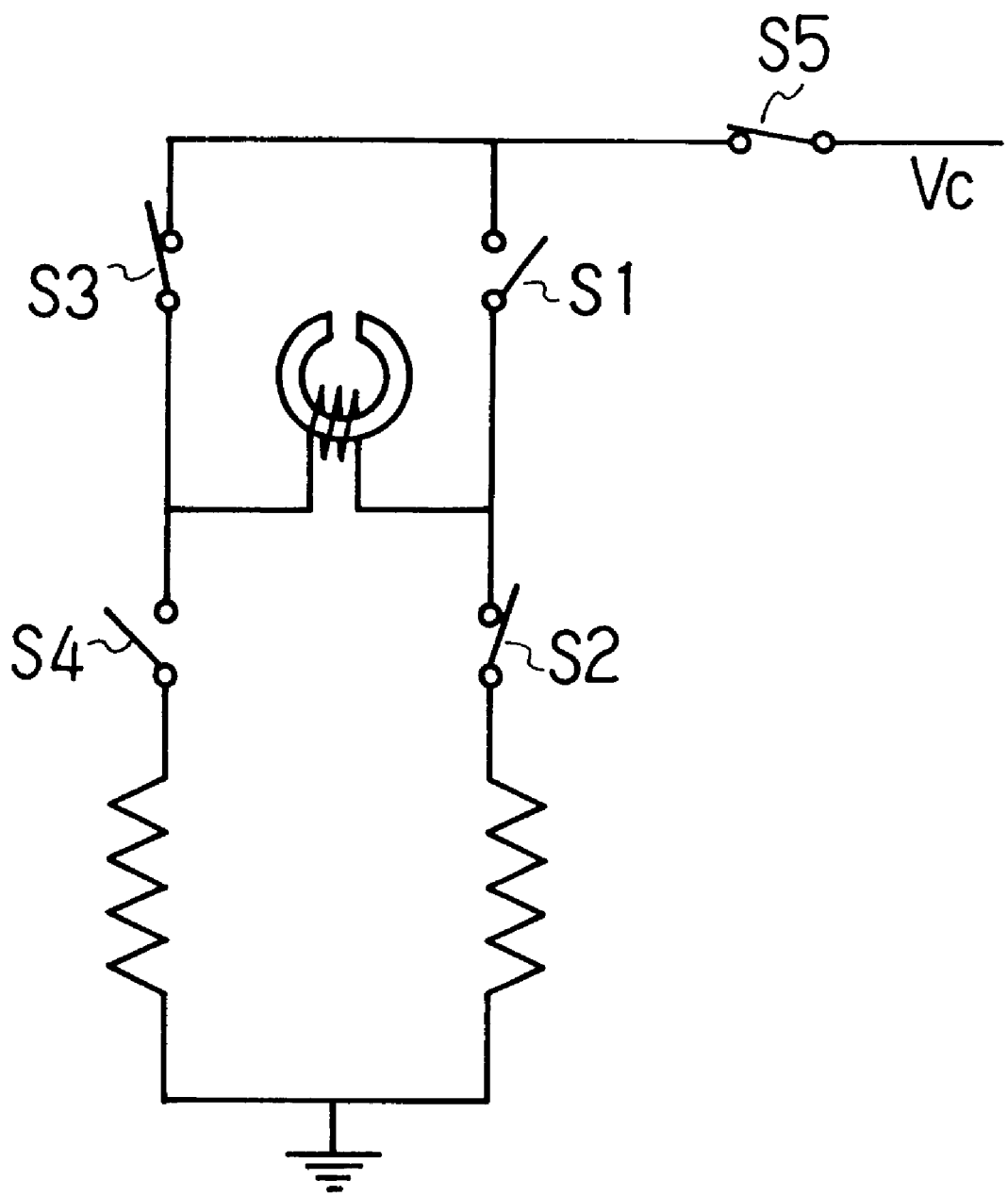
FIG. 12 is an explanatory drawing of operation of the driving circuit of the magnetic head in a preferred embodiment of the present invention.

Moreover, in this example, S1, S2, S3, and S4 have all been put in the OFF position during stand-by, but it is also valid to employ a switch S5, and to put the switch S5 in the OFF position during stand-by, as is shown in FIG. 12. Furthermore, because S1, S2, S3, S4, and S5 make use of a transistor switching operation, strictly speaking, the current flowing through the magnetic head does not necessarily become zero even in the OFF position, since it occurs that an extremely small leaking current is flowing. Even in this case, the positive results of this example are displayed sufficiently, because the current flowing during stand-by is by far smaller then during reading.

(VI) Method for Impressing a Reading Magnetic Field in the Reading State

Next, an example of a method for impressing a reading magnetic field in the reading state is explained. This example uses a magnetic super resolution type magneto-optical recording medium that attains a signal only from one portion of the irradiation domain of the reading beam, and comprises at least a recording layer and a reading layer on a substrate.

In this method, the focused laser light is irradiated as the reading beam, and the magneto-optical recording medium is read, while the magnetic field is modulated using a magnetic head, which is equipped with a slider and glides or floats on the recording medium, to control the translation of the magnetic domain walls. Two examples of this method are explained below.

The first example is characterized in that, in the above mentioned reading method, a magnetic field is alternated with a period equivalent to less than ½ the shortest wavelength of the recording marks, and reading is performed while impressing, in one portion of the beam irradiation domain from which the reading signal is attained, magnetic fields of two polarities, alternatingly in the beginning and the end of the recording marks, i.e. a magnetic field of a polarity that accelerates the transcription of the magnetization of the recording layer into the reading layer, and a magnetic field of a polarity that inhibits the transcription of the magnetization of the recording layer into the reading layer. The second example is characterized in that, in the above mentioned reading method, reading is performed while reversing the polarity of the reading magnetic field immediately, whenever a magnetic reversal of the reading layer is detected.

Figure 13:
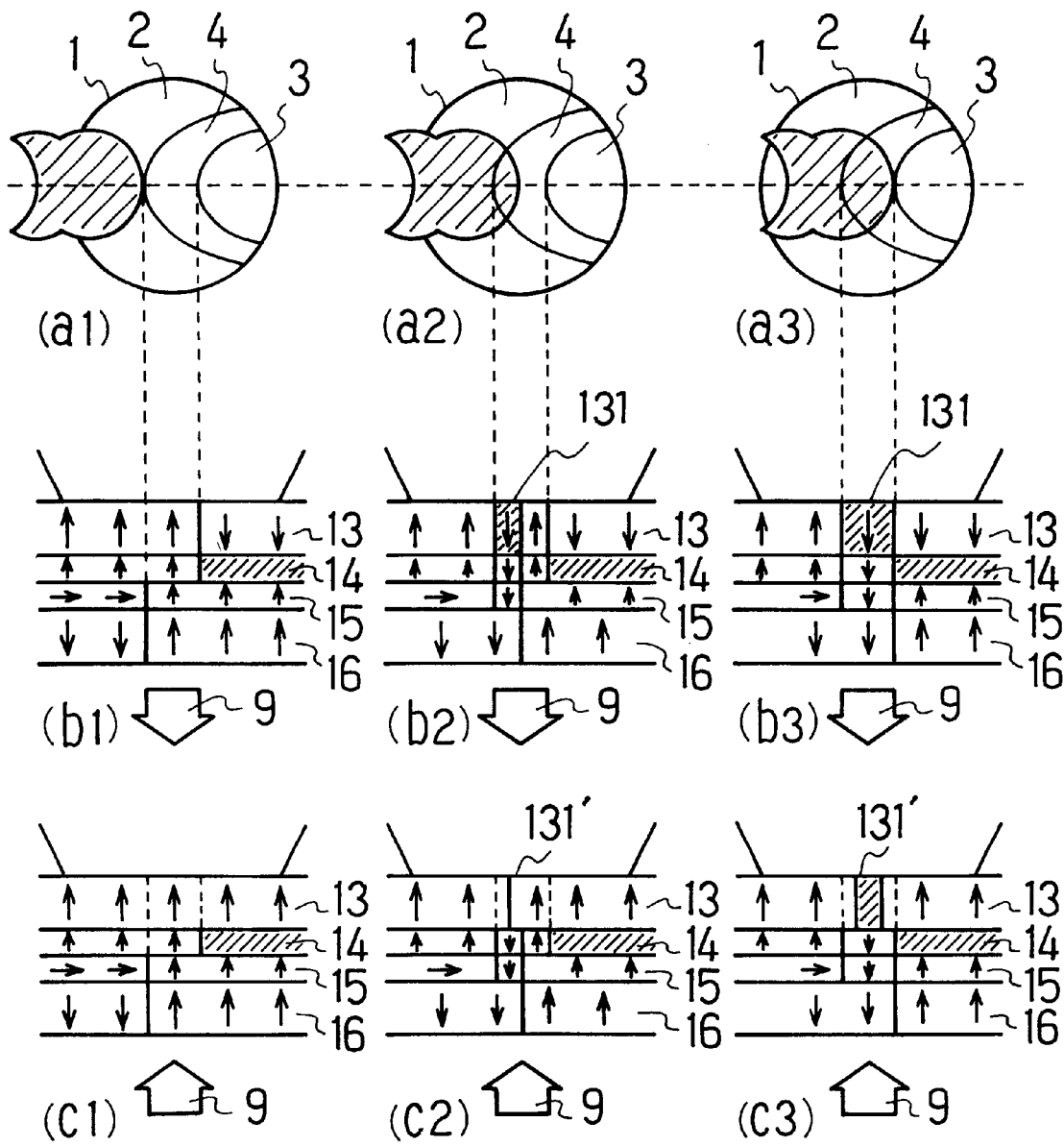
FIG. 13 is an explanatory drawing of the operation of the reading conditions in the beginning portion of a recording mark in a preferred embodiment of the present invention.

Below, the situation will be explained in more detail with reference to the drawings. FIG. 13 illustrates the reading condition in the beginning portion of a recording mark during reading of a magnetic super resolution type magneto-optical recording medium that attains a signal only from one portion of the irradiation domain of the reading beam. The recording medium is similar to the recording medium shown in FIG. 1.

In FIG. 13, (a1), (a2), and (a3) show the relationship between recording marks stored in recording layer 16 and the reading beam 1, for successive points in time. Inside the reading beam irradiation domain 1, the reading layer 13 is magnetized in a fixed direction in a low temperature mask portion 2 and a high temperature mask portion 3, which do not contribute to the reading signal, since only aperture portion 4 contributes to the reading signal. (b1), (b2), and (b3) illustrate the magnetization of reading layer 13, intermediate layer 14, supplementary layer 15 and recording layer 16 when an upward initialization magnetic field and a downward reading magnetic field 9 have been impressed, for the same successive points in time as are shown in (a1), (a2), and (a3). (c1), (c2), and (c3) show the direction of the magnetization of the above mentioned layers for successive points in time, when an upward reading magnetic field 9 has been applied under similar conditions.

Below, the situation is explained in chronological order. In state (a1), the magnetization of recording layer 16 is transcribed in aperture portion 4 to reading layer 13 by exchange coupling between recording layer 16 and reading layer 13, as is shown in (b1) and (c1), and the magnetization of reading layer 13 is turned upwards. If the reading magnetic field 9 faces downwards, then the beginning of the recording mark approaches aperture portion 4, as is shown in (a2), and a magnetization reversal portion 131 is created in aperture portion 4 of the reading layer 13 due to the transcription from the recording layer 16, as is shown in (b2). As time passes, the magnetization reversal portion 131 expands, and in state (a3) the magnetization of almost all of the aperture portion is reversed, as is shown in (b3). This occurs because the magnetic domain walls expand due to the exchange coupling force from recording layer 16 into reading layer 13, but because the reading magnetic field is applied in a direction promoting the translation of magnetic domain walls, these transcriptions are performed smoothly in an extremely short time interval.

However, if the reading magnetic field points upwards, then the magnetic domain walls expand due to the exchange coupling force from the recording layer 16 into the reading layer 13, and the reading magnetic field is applied in a direction inhibiting the translation of magnetic domain walls. Therefore, the expansion speed of the magnetic domain walls lags behind the passage of the magnetic domain walls of the recording layer, even though a magnetization reversal portion 131' is formed, as is shown in (c2) and (c3), and this leads to a reading signal with rather poor response.

As a result, even though the response to the beginning of the recording mark in a downward pointing reading magnetic field is excellent, the response characteristics in an upward pointing reading magnetic field are poor.

Figure 14:
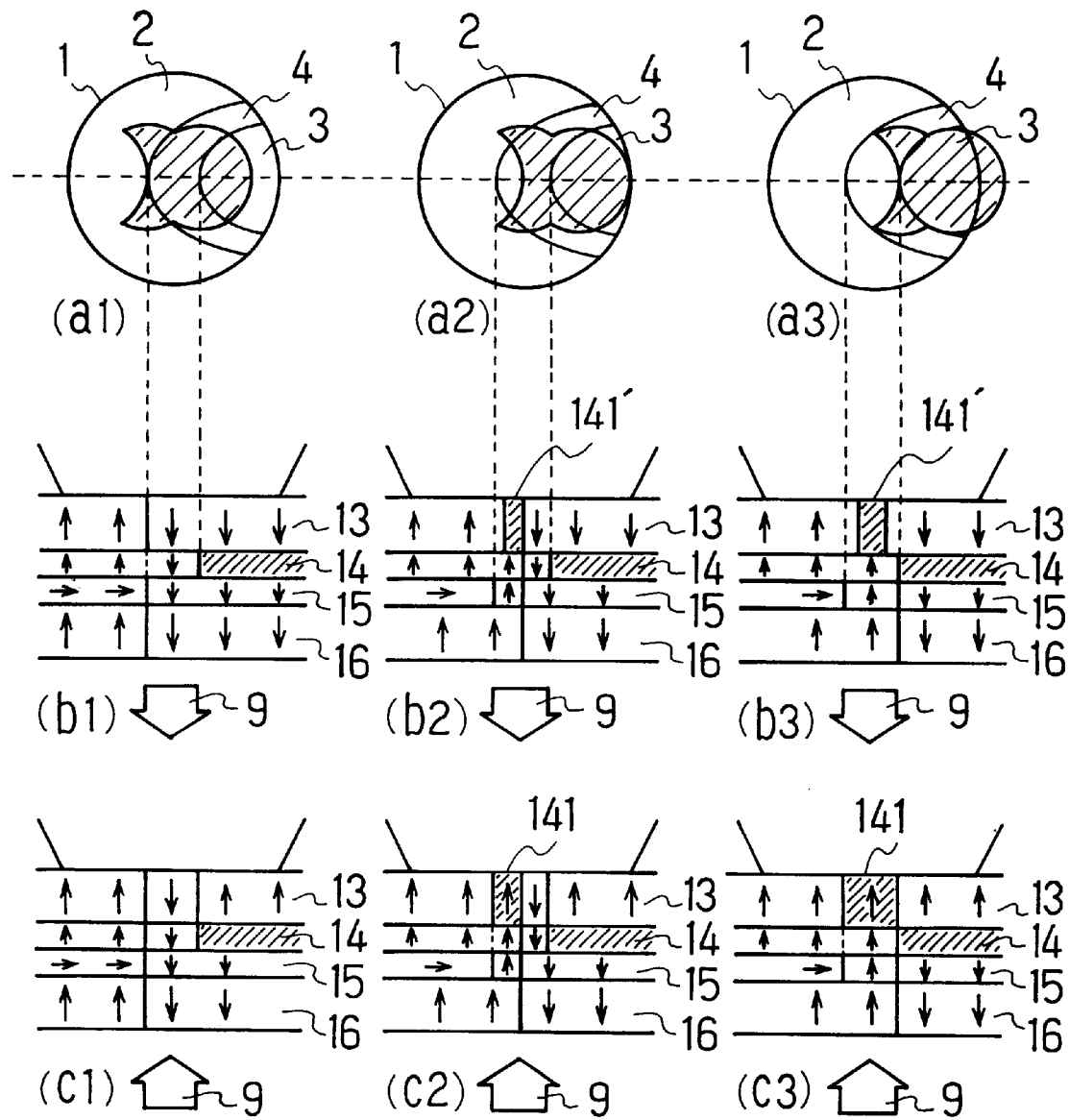
FIG. 14 is an explanatory drawing of the operation of the reading conditions in the end portion of a recording mark in a preferred embodiment of the present invention.

Conversely, FIG. 14 illustrates the reading condition in the end portion of a recording mark during reading of a magnetic super resolution type magneto-optical recording medium that attains a signal only from one portion of the irradiation domain of the reading beam. In FIG. 14, (a1), (a2), and (a3) show the spatial relationship between recording marks stored in recording layer 16 and the reading beam 1, for successive points in time. (b1), (b2), and (b3) illustrate the magnetization of reading layer 13, intermediate layer 14, supplementary layer 15 and recording layer 16 when an upward initialization magnetic field and a downward reading magnetic field 9 have been impressed, for the same successive points in time as are shown in (a1), (a2), and (a3). (c1), (c2), and (c3) show the direction of the magnetization of the above mentioned layers for successive points in time, when an upward reading magnetic field 9 has been impressed under similar conditions.

Below, the situation is explained in chronological order. In state (a1), the magnetization of recording layer 16 is transcribed in aperture portion 4 to reading layer 13 by exchange coupling between recording layer 16 and reading layer 13, as is shown in (b1) and (c1), and the magnetization of reading layer 13 turns downwards. If the reading magnetic field 9 faces upwards, then the end of the recording mark approaches aperture portion 4, as is shown in (a2), and a magnetization reversal portion 141 is created in aperture portion 4 of the reading layer 13 due to the transcription from the recording layer 16, as is shown in (c2). As time passes, the magnetization reversal portion 141 expands, and in state (a3) the magnetization of almost all of the aperture portion is reversed, as is shown in (c3). This occurs because the magnetic domain walls expand due to the exchange coupling force from recording layer 16 into reading layer 13, but because the reading magnetic field is applied in a direction promoting the translation of magnetic domain walls, these transcriptions are performed smoothly in an extremely short time interval.

However, if the reading magnetic field points downwards, then the magnetic domain walls expand due to the exchange coupling force from recording layer 16 into reading layer 13, and the reading magnetic field is applied in a direction inhibiting the translation of magnetic domain walls. Therefore, the expansion speed of the magnetic domain walls lags behind the passage of the magnetic domain walls of the recording layer, even though a magnetization reversal portion 141' is formed, as is shown in (b2) and (b3), and this leads to a reading signal with rather poor response.

As a result, even though the response to the beginning of the recording mark in an upward pointing reading magnetic field is excellent, the response characteristics in a downward pointing reading magnetic field are poor.

To summarize, a comparison of FIG. 13 and FIG. 14 can teach the following:

(a) If the reading magnetic field points downwards, then the beginning of a recording mark shows good response characteristics. As opposed to that, the response characteristics at the end of the recording mark turn poor.

(b) On the other hand, if the reading magnetic field points upwards, then the end of a recording mark shows good response characteristics. As opposed to that, the response characteristics at the beginning of the recording mark turn poor.

Using the above results, reading was performed in this example while alternating a magnetic field with a period equivalent to less than ½ the shortest wavelength of a recording mark. By doing so, magnetic fields of two polarities are impressed alternatingly with great speed in the beginning and the end of the recording marks, and even though the translation of magnetic domain walls is slow in a reading field with one of the two polarities, the magnetization of the recording layer is transcribed instantaneously, when the reading magnetic field with the other polarity is applied.

Figure 15A:
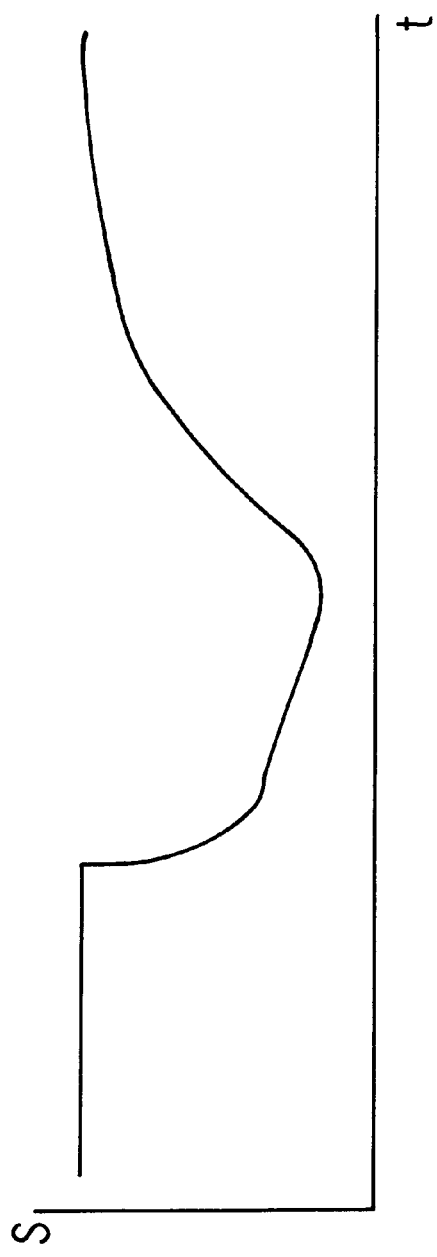
FIGS. 15A–B are explanatory drawings of the operation of a reading magnetic field and a reading signal in a preferred embodiment of the present invention.
Figure 15B:
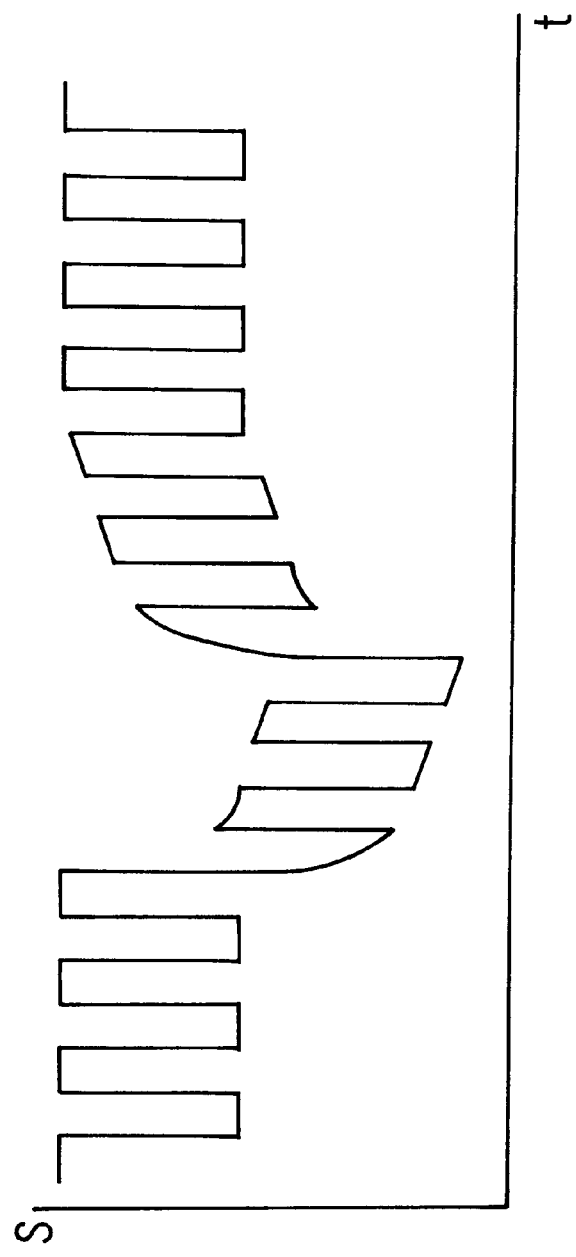

FIG. 15A shows the transient change of a reading signal S, when reading is performed with a reading magnetic field always pointing in same direction, and FIG. 15B shows the transient change of a reading signal S, when the magnetic field is alternating. In the case of reading with a reading magnetic field always pointing in same direction, either a falling response (at the beginning of the recording marks) or a rising response (at the end of the recording marks) becomes poor (in the example shown in FIG. 15A, a rising response is poor), but by adopting the present example, good transition characteristics could be attained for both a falling response (at the beginning of the recording marks) and a rising response (at the end of the recording marks).

Next, a second example is explained in more detail using the drawings. In this example, the same recording medium as in the first example is used. FIG. 16A shows the transient change of the waveform of a reading signal S, and FIG. 16B shows the transient change of a driving magnetic field H during reading. The waveform of the reading signal 163 changes abruptly when the beginning portion of a mark is detected, as is shown by 163a. After a crossing of slice level S2 has been detected, the polarity of the reading magnetic field changes immediately, as is shown by 161 in FIG. 16B. This brings about a level variation L at the time T0 of changing the magnetic field, because the magnetization of the reading layer of the high temperature mask portion 3 reverses. When the end portion of the mark is reached after translating the recording medium, the reading signal again changes abruptly, as is shown by 163b. This time, after a crossing of slice level S3 has been detected, the polarity of the reading magnetic field changes immediately, as is shown by 161 in FIG. 16B.

If the driving waveform of the reading magnetic field does not change until reference as in 162, then the reading signal turns out as shown by 164. In this case, the recording mark is detected as unduly long, because the translation of the magnetic domain walls of the recording layer in the end portion of the mark cannot keep up with the transit speed of the recording medium. However, if the present example is adopted, the signal can be read correctly, because the magnetization of the recording layer can be transcribed instantaneously into the reading layer, regardless of the beginning or end portion of the recording mark.

Furthermore, in the reading method of this example, the reading signal is attained on the basis of the electric signal of the driving magnetic field during reading. Therefore, convenient reading is possible.

Figure 17:
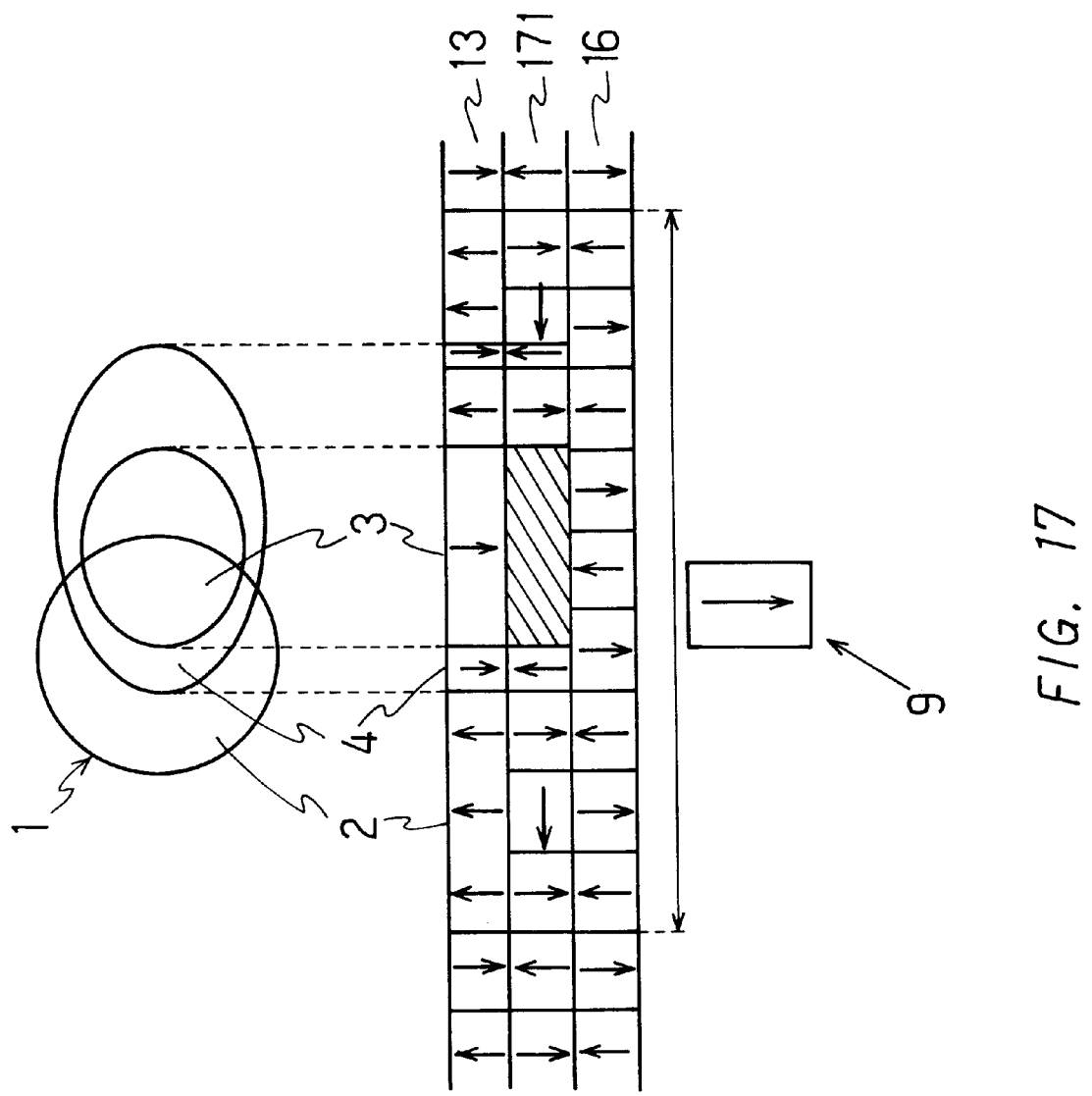
FIG. 17 is a structural drawing of the recording medium in a preferred embodiment of the present invention.

Next, in this second example, the performance of a similar reading using another recording medium is explained with the help of FIGS. 17 and 18. A structure shown in FIG. 17 was used as a recording medium. In FIG. 17, a controlling layer 171 is located between recording layer 16 and reading layer 13. The recording layer 16 and the reading layer 13 are made of a ferrimagnetic film, wherein the magnetization of a transition metal is dominant (TM-rich), whereas the controlling layer 171 is made of a ferrimagnetic film, wherein the magnetization of a rare earth metal is dominant (RE-rich). Furthermore, a structure is provided in which the exchange coupling force between the recording layer 16 and the controlling layer 171 is comparatively weak, the exchange coupling force between the reading layer 13 and the controlling layer 171 is comparatively strong, and the Curie point of the controlling layer 171 is set lower than the Curie point of the other magnetic layers.

The recorded information is stored in recording layer 16, and at room temperature the controlling layer 171 is polarized pointing downwards by a reading magnetic field 9 in the case of the orientation of the example shown in FIG. 17. Thus, the reading layer 13 is magnetized pointing upwards as a total magnetization, because in the controlling layer 171 the magnetization of a rare earth metal is dominant (RE-rich) and in the reading layer the magnetization of a transition metal is dominant (TM-rich). The low temperature mask portion 2 is formed due to this phenomenon.

When the temperature rises due to irradiation with the reading beam, the exchange coupling force between recording layer 16 and controlling layer 171 increases, and in the aperture portion 4, the magnetization of the recording layer 16 is transcribed into the reading layer 13 via the controlling layer 171. On the other hand, because the controlling layer 171 loses magnetism when exceeding the Curie point, the exchange coupling force between the recording layer 16 and the reading layer 13 ceases, the reading layer 13 is magnetized pointing downwards following the orientation of the reading magnetic field 9, and the high temperature mask portion 3 is formed. Consequently, high temperature mask portion 3 and low temperature mask portion 2 are reversed together due to reading magnetic field 9. Furthermore, it is always possible to arrange opposite orientation for the magnetization of the reading layer 13 in the high temperature mask portion 3 and in the low temperature mask portion 2 for any polarity of the reading magnetic field.

By such an operation, two temperature domains, i.e. a low temperature portion and a high temperature portion are masked inside the irradiation domain of the reading beam, and a double mask type super resolution magneto-optical recording medium can be realized, wherein the low temperature mask domain and the high temperature mask domain of the reading layer are magnetized in opposite directions, regardless of the information stored in the recording layer. In this example, such a recording medium is used, and the reading power has been set in such a way that the level of the reading signal is almost the same regardless of the orientation of the reading magnetic field.

In other words, when the reading power is insufficient, a part of the low temperature mask portion 2 widens, and the reading output level swings to the plus side. Conversely, when the reading power is excessive, a part of the high temperature mask portion 3 widens, and the reading output level swings to the minus side. This phenomenon is inverted if the polarity of the reading magnetic field 9 is reversed. In that case, when the reading power is insufficient, a part of the low temperature mask portion 2 widens and the reading output level swings to the minus side, whereas, when the reading power is excessive, a part of the high temperature mask portion 3 widens, and the reading output level swings to the plus side.

A portion of the recording layer 16 is used, where the magnetization is directed either upwards or downwards. Moreover, the aperture portion 2 is positioned in the center of the reading beam irradiation domain 1 and a suitable reading power can be selected so that variations of the reading output level do not occur, even when the reading magnetic field is reversed.

Figure 18A:
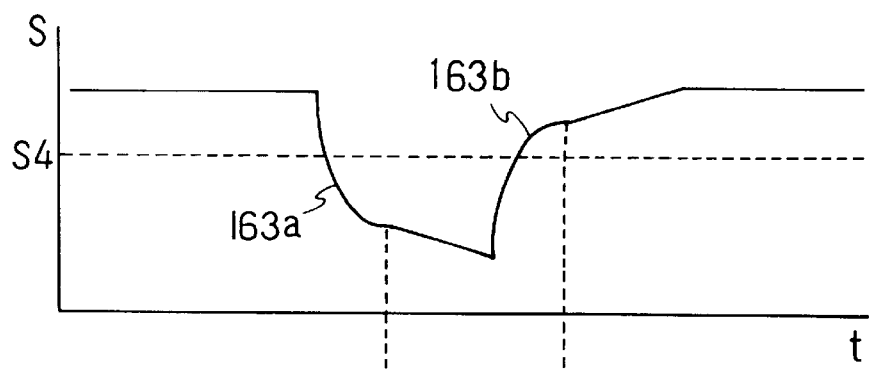
FIGS. 18A–B are explanatory drawings of the operation of a reading magnetic field and a reading signal in a preferred embodiment of the present invention.
Figure 18B:
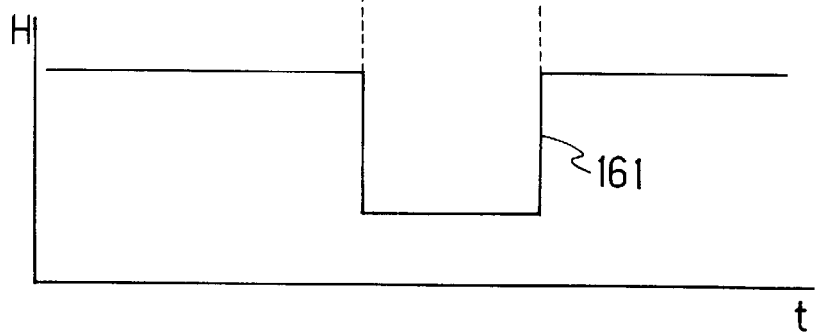
Figure 19:
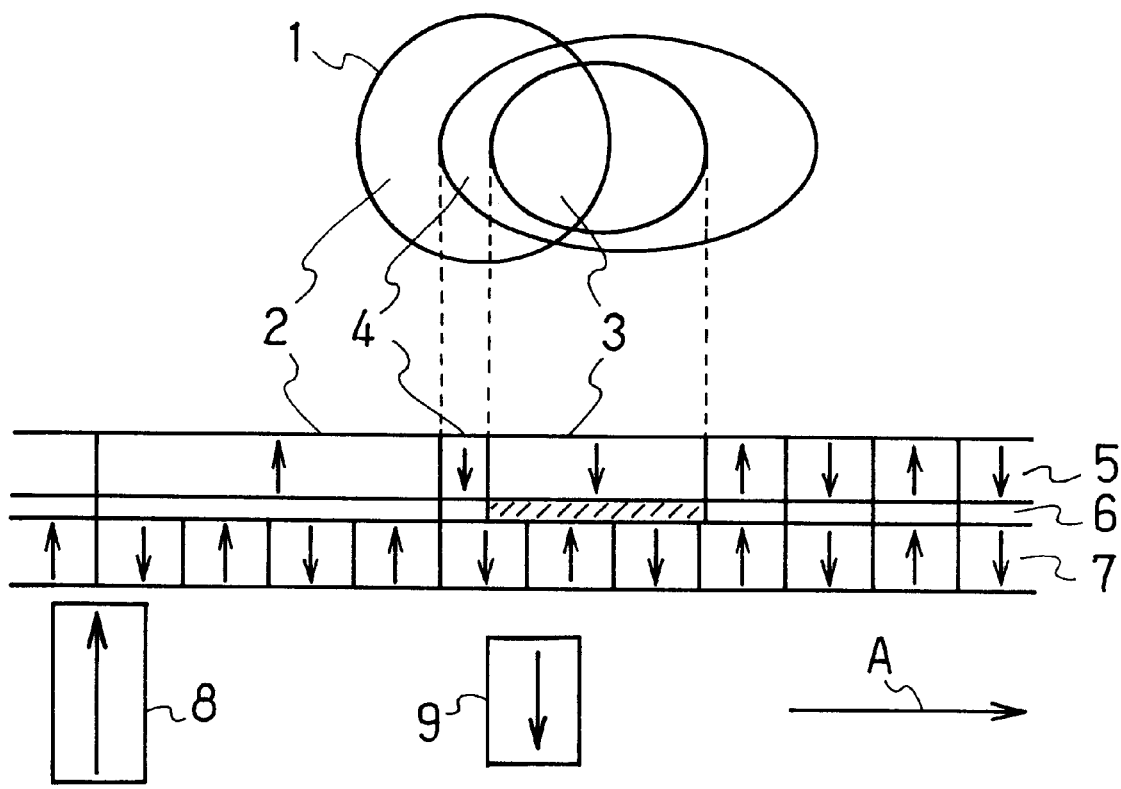
FIG. 19 is a principal drawing of the operation in a conventional double mask type magnetic induction type super resolution recording medium.

Next, reading while applying magnetic fields with opposite polarities at the beginning and at the end of a recording mark is explained for the recording medium shown in FIG. 17. FIG. 18A shows the transient change of a reading signal S, FIG. 18B shows the transient change of a reading magnetic field H.

As can be understood from comparison with the first example shown in FIG. 16, the level variation accompanying the switching of the reading magnetic field is suppressed, and a reading that correctly responds to the length of recording marks can be performed just by detecting a downward crossing point or an upward crossing point of slice level S4.

On the other hand, this method is valid for a reading method, in which: in a magnetic super resolution type magneto-optical recording medium that attains a signal only from one portion of the irradiation domain of the reading beam and has at least a recording layer and a reading layer on a substrate, a focused laser light is irradiated as a reading beam and a magnetic field is modulated, using a magnetic head, which is equipped with a slider and glides or floats on the magnetic super resolution type magneto-optical recording medium; reading is performed while impressing a magnetic field in a direction so that at least the translation of magnetic domain walls is promoted, and a magnetic field is alternated with a period equivalent to less than ½ the shortest wavelength of the recording marks; in one portion of the beam irradiation domain from which the reading signal is attained, magnetic fields of two polarities, i.e. a magnetic field with a polarity that accelerates the transcription of the magnetization of the recording layer into the reading layer, and a magnetic field with a polarity that inhibits the transcription of the magnetization of the recording layer into the reading layer, are alternatingly impressed with a fixed period.

The present invention as described above brings about the following effects:

(1) A correct reading can be performed according to the length of recording marks by reading a magneto-optical recording medium while impressing a magnetic field with an orientation promoting the translation of magnetic domain walls. High density and high transmission rate become possible.

(2) High density and high transmission rate become possible due to performing reading while impressing alternatingly with a fixed period, in one portion of the beam irradiation domain from which the reading signal is attained, magnetic fields of two polarities, i.e. a magnetic field with a polarity that accelerates the transcription of the magnetization of the recording layer into the reading layer, and a magnetic field with a polarity that inhibits the transcription of the magnetization of the recording layer into the reading layer.

(3) High density and high transmission rate become possible because reading is performed while impressing alternatingly magnetic fields of differing polarities at the end portion and the beginning portion of the recording marks.

(4) It is possible to reduce the magnetic field for recording necessary for an initialization by performing a pretreatment, in which a range bigger than the domain formed by the recording marks is already polarized on the magneto-optical recording medium in the same orientation as the initialization at the reading time.

(5) Using a disk-shaped magneto-optical recording medium with position adjustment having an eccentricity of more than 50 μm, the magnetic head is adjusted into an exact position by observing the reading signal while the magnetic head is moved along the surface of the magneto-optical recording medium.

(6) Even if the temperature changes after the initialization or tilt occurs due to humidity variation and the like, it is still possible to perform recording/reading/erasure with the most suitable operation power by detecting the critical reading power for each sector that constitutes a smallest recording unit.

(7) It is possible to avoid deletion of marks recorded in neighboring tracks, or an increase of cross-talk by determining a suitable recording power with a test-writing preceding the recording.

(8) The dissipated can be reduced by reducing driving current of the magnetic head and the laser power during stand-by for reading.

(9) The most suitable reading power can be selected by reading the recorded information while continuously setting the reading power, so that the reading signal level stays almost the same regardless of the orientation of the reading magnetic field.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for reading a magneto-optical recording medium, wherein the magneto-optical recording medium is read while controlling translation of magnetic domain walls by irradiating focused laser light as a reading beam on a magnetic super resolution type magneto-optical recording medium that attains a signal only from one portion of the irradiation domain of the reading beam and is provided with a recording layer and reading layer on a substrate, and by modulating a magnetic filed by using a magnetic head, which is equipped with a slider and glides or floats on the magnetic super resolution type magneto-optical recording medium, and alternating, with a period equivalent to less than ½ the shortest wavelength of the recording marks, the polarity of the magnetic field between a polarity that accelerates a transcription of the magnetization of the recording layer into the reading layer and a polarity that delays a transcription of the magnetization of the recording layer into the reading layer, in a portion of the beam irradiation domain from which the reading signal is attained.

2. The method according to claim 1, wherein the magneto-optical recording medium is read while reversing the polarity of the reading magnetic field immediately whenever a magnetic reversal of the reading layer is detected.

3. The method according to claim 2, wherein the reading signal is attained on the basis of an electric signal for driving the magnetic field during reading.

* * * * *